US012771463B2

(12) United States Patent
Terado et al.

(10) Patent No.: US 12,771,463 B2
(45) Date of Patent: Oct. 20, 2026

(54) RANGING DEVICE

(71) Applicant: ALPS ALPINE CO., LTD., Tokyo (JP)

(72) Inventors: Yusuke Terado, Miyagi (JP); Daisuke Takai, Tokyo (JP)

(73) Assignee: ALPS ALPINE CO., LTD., Tokyo (JP)

( * ) Notice: Subject to any disclaimer, the term of this patent is extended or adjusted under 35 U.S.C. 154(b) by 189 days.

(21) Appl. No.: 18/940,132

(22) Filed: Nov. 7, 2024

(65) Prior Publication Data

US 2025/0070896 A1 Feb. 27, 2025

Related U.S. Application Data

(63) Continuation of application No. PCT/JP2023/007726, filed on Mar. 2, 2023.

(30) Foreign Application Priority Data

Jun. 21, 2022 (JP) ................................ 2022-099835

(51) Int. Cl.
*G01S 11/10* (2006.01)
*H04B 17/27* (2015.01)
*H04B 17/318* (2015.01)

(52) U.S. Cl.
CPC .............. *H04B 17/27* (2015.01); *G01S 11/10* (2013.01); *H04B 17/318* (2015.01)

(58) Field of Classification Search
CPC ........ G01S 13/58; G01S 11/02; G01S 13/765; G01S 13/825; G01S 13/84; G01S 7/352; G01S 7/4863; G01S 11/00; G01S 17/36; G01S 17/89; G01S 7/4915; G01S 17/08; G01S 13/288; G01S 7/4808; G01S 7/487; G01S 13/42; G01S 17/02; G01S 17/26; G01S 13/06; G01S 13/284; G01S 13/878; G01S 7/023; G01S 7/28; G01S 11/06;
(Continued)

(56) References Cited

U.S. PATENT DOCUMENTS

2013/0201003 A1 8/2013 Sabesan et al.
2018/0065597 A1* 3/2018 Kim .................. G07C 9/00309
2018/0308305 A1* 10/2018 Austen .................... B60R 25/24
2019/0227141 A1* 7/2019 Nishikawa ............. G01S 1/045
(Continued)

FOREIGN PATENT DOCUMENTS

JP 2019-128341 8/2019
JP 2019-174418 10/2019
(Continued)

OTHER PUBLICATIONS

International Search Report for PCT/JP2023/007726 mailed on Apr. 18, 2023.

*Primary Examiner* — Nimesh Patel
(74) *Attorney, Agent, or Firm* — IPUSA, PLLC

(57) ABSTRACT

A ranging device extracts N signal pairs corresponding to N (N>=2) signal strengths excluding one or more signal strengths less than a threshold value among signal strengths of the signal pairs of the first signals and the second signals from the plurality of signal pairs, obtains a reciprocating phase obtained by summing the first phases and the second phases of the first signals and the second signals included in each signal pair for the N signal pairs, and measures a distance to the other device based on the N reciprocating phases and the plurality of frequencies.

10 Claims, 15 Drawing Sheets

(58) Field of Classification Search
CPC . G01S 13/28; G01S 1/08; G01S 17/50; G01S 5/0284; G01S 5/0295; H04B 17/318; H04B 7/0617; H04B 7/086; H04B 7/0691; H04B 7/06956; H04B 7/0874; H04B 7/088; H04B 17/336; H04B 7/0682; H04B 7/06952; H04B 1/7174; H04B 1/0483; H04B 7/0413; H04B 7/0695; B60R 2325/101; B60R 25/24; H04W 16/28; H04W 64/00; H04W 56/002; H04W 4/029; H04W 4/38; H04W 4/40; H04W 4/70; H04W 72/541
See application file for complete search history.

(56) References Cited

U.S. PATENT DOCUMENTS

| | | | | |
|---|---|---|---|---|
| 2019/0346554 | A1 | 11/2019 | Park et al. | |
| 2020/0196095 | A1* | 6/2020 | Smith | H04B 17/0082 |
| 2020/0395978 | A1* | 12/2020 | Romme | G01S 13/84 |
| 2020/0408868 | A1* | 12/2020 | Eggert | G01P 1/00 |
| 2022/0397656 | A1 | 12/2022 | Nakano et al. | |
| 2023/0070913 | A1 | 3/2023 | Nakano et al. | |
| 2024/0085550 | A1 | 3/2024 | Nakano et al. | |
| 2024/0295650 | A1* | 9/2024 | Yamada | G01S 13/84 |
| 2026/0003065 | A1* | 1/2026 | Saito | G01S 13/82 |

FOREIGN PATENT DOCUMENTS

| | | |
|---|---|---|
| WO | 2021/095558 | 5/2021 |
| WO | 2021/193386 | 9/2021 |
| WO | 2022/153773 | 7/2022 |

* cited by examiner

RANGING DEVICE

CROSS-REFERENCE TO RELATED APPLICATIONS

This application is a continuation application of International Application No. PCT/JP2023/007726 filed on Mar. 2, 2023 and designated the U.S., which is based upon and claims priority to Japanese Patent Application No. 2022-099835, filed on Jun. 21, 2022, the entire contents of which are incorporated herein by reference.

BACKGROUND OF THE INVENTION

1. Field of the Invention

The present disclosure relates to ranging devices. The ranging device is an example of a distance measuring device.

2. Description of the Related Art

As an example, a ranging device proposed in Japanese Laid-Open Patent Publication No. 2019-128341 includes a first device, a second device, and a calculation device. The first device includes a first transceiver that transmits a first known signal corresponding to a first carrier frequency and a second known signal corresponding to a second carrier frequency different from the first carrier frequency, and receives a third known signal corresponding to the first carrier frequency and a fourth known signal corresponding to the second carrier frequency. The second device includes a second transceiver that transmits the third known signal and the fourth known signal and receives the first and second known signals. The calculation device calculates a distance between the first device and the second device, based on phases of the first through fourth known signals. The first transceiver and the second transceiver make a total of four transmissions and four receptions including one transmission of each of the first and third known signals and one reception of each of the first and third known signals, and one transmission of each of the second and fourth known signals and one reception of each of the second and fourth known signals.

If a multipath occurs in a radio frequency (RF) signal, such as the first through fourth known signals, when measuring the distance, the phase of the radio wave arriving after being reflected on the way is different from the phase of the radio wave directly arriving from a device of a transmission source. In such a case, it may not be possible to accurately measure the distance, because a propagation path of the radio wave arriving after being reflected on the way differs from a propagation path of the radio wave directly arriving from the device of the transmission source.

SUMMARY OF THE INVENTION

Accordingly, one object of the present disclosure is to provide a ranging device capable of accurately measuring a distance even in an environment where a multipath occurs.

A ranging device according to one aspect of the present disclosure includes a memory device configured to store a program; and a processor configured to execute the program stored in the memory and perform a process including transmitting a first signal to an other device; receiving a second signal from the other device that receives the first signal; acquiring a plurality of first phases when the other device receives a plurality of first signals having three or more kinds of frequencies transmitted by the transmitting to the other device at different timings; measuring a plurality of second phases when the receiving receives a plurality of second signals having the three ore more kinds of frequencies transmitted from the other device at different timings; acquiring a signal strength of a pair of the first signal and the second signal having identical frequencies, with respect to a plurality of signal pairs of the plurality of first signals and the plurality of second signals; calculating a reciprocating phase by summing the first phase and the second phase of the first signal and the second signal included in each first signal pair of the plurality of first signal pairs, for each signal pair of the plurality of signal pairs; extracting, from the plurality of signal pairs, N signal pairs corresponding to N (N is an integer of 2 or more) signal strengths, excluding one or a plurality of signal strengths less than a predetermined threshold value among signal strengths of the plurality of signal pairs; measuring a distance to the other device, based on the N reciprocating phases and the plurality of frequencies; controlling a transmission and a reception, including causing the transmitting to repeatedly perform a transmission process to transmit the first signal with respect to the other device during a predetermined period, to transmit the first signals having the three or more kinds of frequencies to the other device at the different timings, and causing the receiving to repeatedly perform a reception process to receive the second signal from the other device during the predetermined period, to receive the second signals having the three or more kinds of frequencies from the other device at the different timings; and correcting a change in the reciprocating phase due to a relative movement with respect to the other device, for each reciprocating phase of the N reciprocating phases, wherein the measuring the distance measures the distance to the other device, based on the N reciprocating phases corrected by the correcting, and the plurality of frequencies.

Other objects and further features of the present invention will be apparent from the following detailed description when read in conjunction with the accompanying drawings.

DESCRIPTION OF THE PREFERRED EMBODIMENTS

Hereinafter, embodiments applied with a ranging device according to the present invention will be described.

Figure 1:
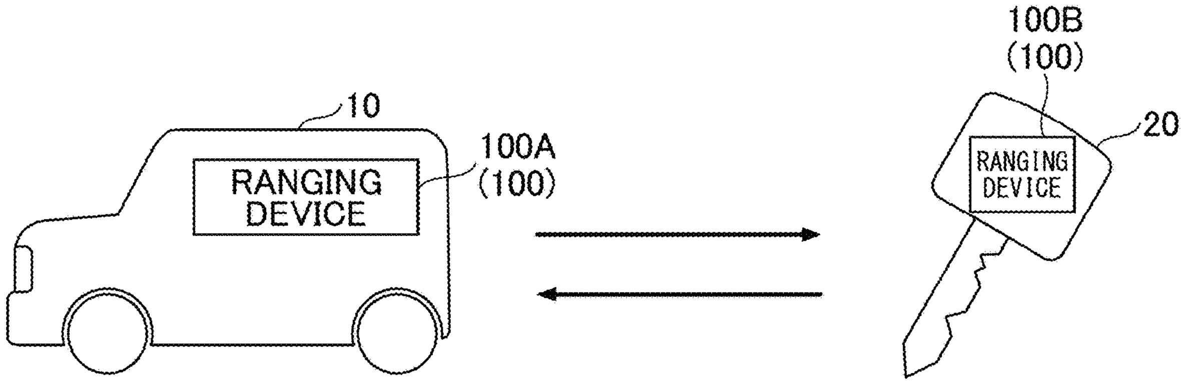
FIG. 1 is a diagram illustrating a vehicle 10 and a smart key 20 provided with ranging devices 100A and 100B according to one embodiment, respectively.

FIG. 1 is a diagram illustrating the vehicle and the smart key 20 provided with the ranging devices 100A and 100B according to one embodiment, respectively. As an example, a configuration in which the ranging device 100A is implemented in a smart entry system installed in the vehicle 10, and the ranging device 100B is implemented in the smart key 20 of the vehicle 10, will be described. The ranging devices 100A and 100B perform packet communication by bluetooth low energy (BLE, registered trademark), for example. In addition, an automatic parking assistance system is installed in the vehicle 10, for example, and the ranging device 100A is included in the automatic parking assistance system. The automatic parking assist system remotely transmits a command from the smart key 20 to the vehicle 10 by a wireless communication, to cause the vehicle 10 to autonomously park at a parking position or cause the vehicle 10 to autonomously exit from the parking position.

At least one of the ranging device 100A of the vehicle 10 and the ranging device 100B of the smart key measures the distance between the vehicle 10 and the smart key 20, and doors, a trunk lid, or the like of the vehicle 10 can be unlocked when the distance measured by the ranging device 100A or 100B is an appropriate value.

It is assumed in this example that the ranging device 100A of the vehicle 10 performs a distance measurement, and notifies a result of the distance measurement to the ranging device 100B of the smart key 20. The ranging devices 100A and 100B may have the same configuration, for example. For this reason, in the following description, in a case where the ranging devices 100A and 100B are not distinguished from each other, the ranging devices 100A and 100B are simply referred to as ranging devices 100. The ranging device 100B that does not perform the distance measurement, between the ranging device 100A of the vehicle 10 and the ranging device 100B of the smart key 20, is an example of another device. In this example, the ranging device 100B of the smart key 20 may be an example of the other device. The ranging device 100A may be regarded as a master device, and the ranging device 100B may be regarded as a slave device. Alternatively, the ranging device 100B may be regarded as the master device, and the ranging device 100A may be regarded as the slave device. The ranging devices 100A and 100B are not limited to the master and slave devices in the following description.

<Configuration of Ranging Device 100A>

Figure 2:
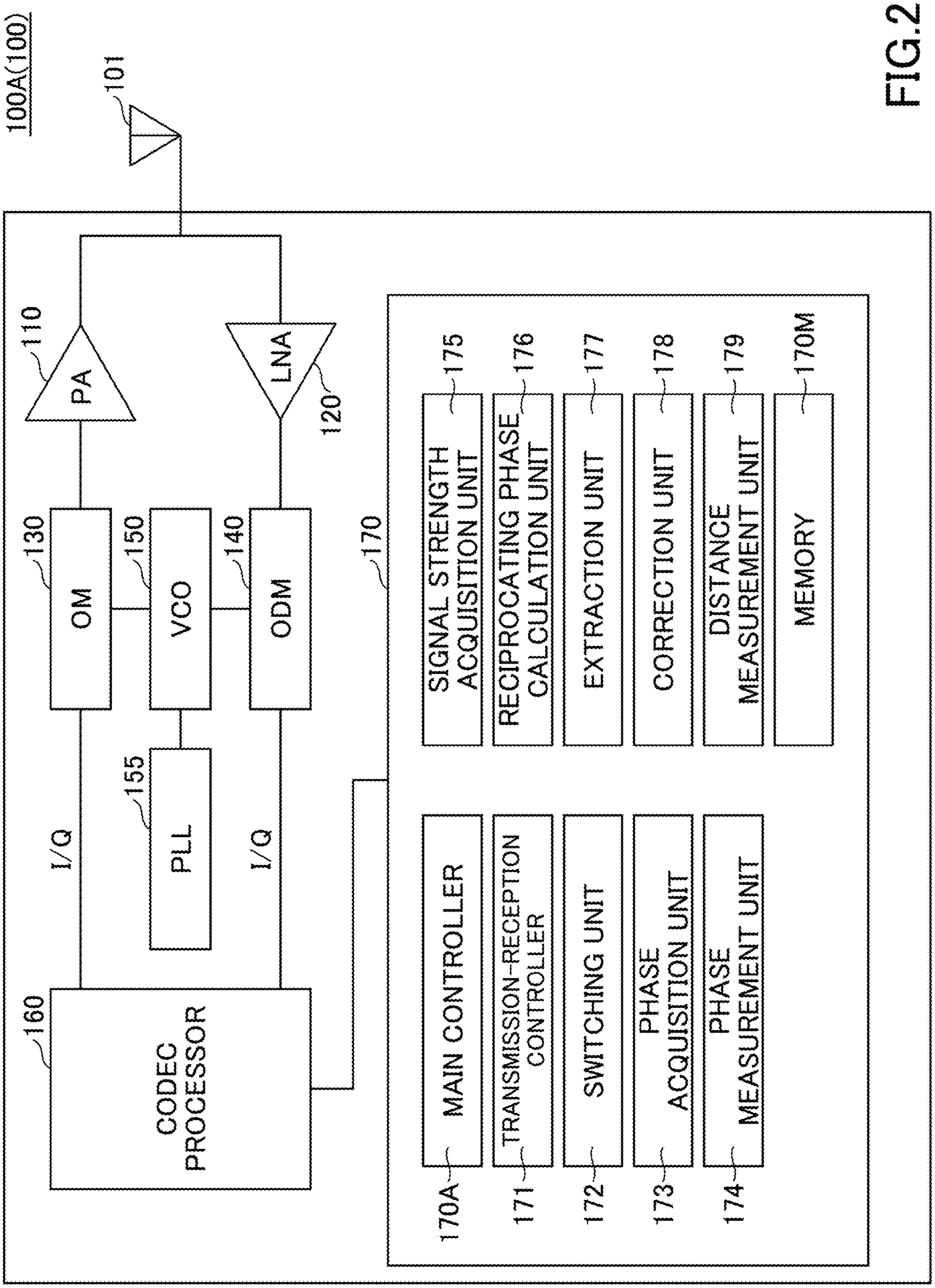
FIG. 2 is a diagram illustrating the ranging device 100A according to the embodiment.

FIG. 2 is a diagram illustrating the ranging device 100A according to the embodiment. As described above, the ranging device 100A of the vehicle 10 and the ranging device 100B of the smart key 20 have the same configuration. In this example, the ranging device 100A that performs the distance measurement will be described. In the following description, a signal transmitted by the ranging device 100A from an antenna 101 to the ranging device 100B will be referred to as a first signal, and a signal transmitted by the ranging device 100B from an antenna 101 to the ranging device 100A will be referred to as a second signal.

The ranging device 100A includes the antenna 101, a power amplifier (PA) 110, a low noise amplifier (LNA) 120, an orthogonal modulator (OM) 130, an orthogonal demodulator (ODM) 140, a voltage controlled oscillator (VCO) 150, a phase locked loop (PLL) 155, a codec processor 160, and the control device 170.

The communication between the ranging device 100A of the vehicle 10 and the ranging device 100B of the smart key 20 is performed via the antenna 101 of the ranging device 100A and the antenna 101 of the ranging device 100B. The antenna 101 is connected to the PA 110 and the LNA 120. An illustration of a switch for switching a connecting destination of the antenna 101 to one of the PA 110 and the LNA 120 is omitted for the sake of convenience. The antenna 101 of the ranging device 100A transmits the first signal to the ranging device 100B and receives the second signal from the ranging device 100B.

The PA 110 is provided between the OM 130 and the antenna 101, amplifies a transmitting modulated signal (first signal) input from the OM 130, and outputs the amplified first signal to the antenna 101. The PA 110 is a transmitting amplifier.

The LNA 120 is provided between the antenna 101 and the ODM 140, and amplifies the second signal received by the antenna 101 with low noise, and outputs the amplified second signal to the ODM 140. The LNA 120 is a receiving amplifier.

The OM 130 is an example of a transmission unit, The OM 130 modulates a I/Q signal input from the codec processor 160 using a high-frequency signal input from the VCO 150, and outputs a modulated signal to the PA 110 as the transmitting modulated signal.

The ODM 140 is an example of a reception unit, The ODM 140 demodulates a signal output from the VCO 150 using a high-frequency signal input from the LNA 120 to acquire an I/Q signal, and outputs the I/Q signal to the codec processor 160. The signal output from LNA 120 is the signal received by the ranging device 100A from the ranging device 100B.

The VCO 150 oscillates at a frequency set by the PLL 155. The VCO 150 can oscillate at a plurality of frequencies set by the PLL 155.

The PLL 155 sets the frequency at which the VCO 150 oscillates. The PLL 155 can set a plurality of frequencies to the VCO 150.

The codec processor 160 includes an analog-to-digital converter (ADC) and a digital-to-analog converter (DAC), and performs a codec process. The codec processor 160 performs processes such as detection of a BLE (registered trademark) packet, address determination, or the like. More specifically, the codec processor 160 performs an analog-to-digital conversion (ADC process) on the I/Q signal processed in the ODM 140, and converts the I/Q signal into BLE packet information. In addition, the codec processor 160 generates the I/Q signal (divided into an in-phase component (I signal) and a quadrature component (Q signal)) from the BLE packet (digital signal) input from the control device 170, converts the I/Q signal into an analog signal by a DAC process, and outputs the analog I/Q signal to the OM 130 as a transmission signal.

Hereinafter, a signal having a predetermined frequency, transmitted from the OM 130 of the ranging device 100A to the ranging device 100B, will be referred to as the transmission signal. Further, a signal transmitted by the ranging device 100A as the transmission signal and received by another device will be referred to as a reception signal.

The control device 170 includes a main controller 170A, a transmission-reception controller 171, a switching unit 172, a phase acquisition unit 173, a phase measurement unit 174, a signal strength acquisition unit 175, a reciprocating phase calculation unit 176, an extraction unit 177, a correction unit 178, a distance measurement unit 179, and a memory 170M. The memory 170M is an example of a storage unit. The control device 170 may be implemented by a microcomputer including a central processing unit (CPU), a random access memory (RAM), a read only memory (ROM), an input-output interface, an internal bus, or the like. In other words, the control device 170 may be implemented by a computer including a memory that stores a program, and a processor configured to execute the program and perform processes of the control device 170, that is, perform functions of the main controller 170A, the transmission-reception controller 171, the switching unit 172, the phase acquisition unit 173, the phase measurement unit 174, the signal strength acquisition unit 175, the reciprocating phase calculation unit 176, the extraction unit 177, the correction unit 178, and the distance measurement unit 179. The memory that stores the program may be a non-transitory computer-readable storage medium.

The main controller 170A, the transmission-reception controller 171, the switching unit 172, the phase acquisition unit 173, the phase measurement unit 174, the signal strength acquisition unit 175, the reciprocating phase calculation unit 176, the extraction unit 177, the correction unit 178, and the distance measurement unit 179 in FIG. 2 are illustrated as functional blocks corresponding to the functions of the control device 170, which may be implemented by the computer by executing the program stored in the memory of the computer. The memory 170M functionally represents a memory (or storage unit) of the control device 170, which may be implemented by the memory of the computer.

The main controller 170A is a processing unit that controls the processes of the control device 170, and performs processes other than the processes performed by the transmission-reception controller 171, the switching unit 172, the phase acquisition unit 173, the phase measurement unit 174, the signal strength acquisition unit 175, the reciprocating phase calculation unit 176, the extraction unit 177, the correction unit 178, and the distance measurement unit 179. The main controller 170A notifies a result of the distance measurement to the ranging device 100B of the vehicle 10, for example. A BLE packet communication using a frequency different from that of the communication for the distance measurement is used for the notification of the result of the distance measurement. When making this notification, the result of the distance measurement or the like may be written in a payload of the BLE packet.

The transmission-reception controller 171 performs a control related to transmission and reception of the first signal and the second signal between the ranging device 100A and the ranging device 100B. More specifically, the transmission-reception controller 171 sets the frequency (predetermined frequency) and phase of the signal transmitted from the ranging device 100A to the ranging device 100B. In addition, because the ranging device 100B transmits to the ranging device 100A the signal having the same frequency as the signal transmitted from the ranging device 100A, the transmission-reception controller 171 of the ranging device 100B sets the frequency (predetermined frequency) and phase of the signal transmitted from the ranging device 100B to the ranging device 100A. The same frequency of the signals transmitted between the ranging devices 100A and 100B may be determined in advance between the ranging devices 100A and 100B, and the ranging devices 100A and 100B may share data indicating the frequency by utilizing the BLE packet communication.

Moreover, the transmission-reception controller 171 causes the OM 130 to repeatedly perform a transmission process to transmit the first signal to the ranging device 100B during a predetermined period, and causes the OM 130 to transmit the first signals having a plurality of kinds of frequencies (for example, three or more kinds of frequencies) to the ranging device 100B at different timings. Further, the transmission-reception controller 171 causes the ODM 140 to repeatedly perform a reception process to receive the second signal from the ranging device 100B during the predetermined period, and causes the ODM 140 to receive the second signals having a plurality of kinds of frequencies (for example, three or more kinds of frequencies) from the ranging device 100B at different timings. The predetermined period is a continuous wave transmission period of BLE (registered trademark), and is 2.5 milliseconds (ns). During the predetermined period, the first signal is transmitted from the ranging device 100A to the ranging device 100B, and the second signal is transmitted from the ranging device 100B to the ranging device 100A.

The transmission-reception controller 171 causes the OM 130 to transmit the first signal a plurality of times for each of a plurality of frequencies f1 through fm (m is an integer greater than or equal to two), and causes the ODM 140 to receive the second signal a plurality of times for each of the plurality of frequencies f1 through fm. That is, the OM 130 transmits the first signal a plurality of times at different timings for each of the plurality of frequencies f1 through fm. On the other hand, the ODM 140 receives the second signal a plurality of times for each of the plurality of frequencies f1 through fm. The first signal is transmitted a plurality of times at each of the plurality of frequencies f1 through fm and the second signal is received a plurality of times at each of the plurality of frequencies f1 through fm, in order to obtain a plurality of reciprocating phases at each of the plurality of frequencies f1 through fm.

As an example, a mode in which the transmission-reception controller 171 causes the OM 130 to transmit the first signal twice for each of the plurality of frequencies f1 through fm and causes the ODM 140 to receive the second signal twice for each of the plurality of frequencies f1 through fm will be described. The OM 130 transmits the first signal over two transmission processes, that is, a first transmission process and a second transmission process, for each of the plurality of frequencies f1 through fm. The ODM 140 receives the second signal over two reception processes, that is, a first reception process and a second reception process, for each of the plurality of frequencies f1 through fm.

Accordingly, a description will be given of the mode in which the transmission-reception controller 171 causes the OM 130 to transmit the first signal twice over two transmission processes, that is, the first transmission process and the second transmission process, for each of the plurality of frequencies f1 through fm, and causes the ODM 140 to receive the second signal twice over two reception processes, that is, the first reception process and the second reception process, for each of the plurality of frequencies f1 through fm. The number of times the transmission process is performed (the number of times the first signal is transmitted) and the number of times the reception process is performed (the number of times the second signal is received) for each of the plurality of frequencies f1 through fm may be three or more, as long as the number of times the transmission process is performed and the number of times the reception process is performed are the same.

A time frame in which the OM 130 performs the first transmission process for each of the plurality of frequencies f1 through fm and a time frame in which the ODM 140 performs the first reception process for each of the plurality of frequencies f1 through fm overlap each other. That is, the first transmission process and the first reception process are performed in the same time frame. A time frame in which the OM 130 performs the second transmission process for each of the plurality of frequencies f1 through fm and a time frame in which the ODM 140 performs the second reception process for each of the plurality of frequencies f1 through fm overlap each other. That is, the second transmission process and the second reception process are performed in the same time frame. The time frame in which the first transmission process and the first reception process are performed is different from the time frame in which the second transmission process and the second reception process are performed.

The switching unit 172 switches between a transmission state where the OM 130 transmits the signal and a reception state where the ODM 140 receives the signal. The switching unit 172 enables the PA 110 to amplify the signal in the transmission state, and enables the LNA 120 to amplify the signal in the reception state. The switching unit 172 provides a stabilization time for stabilizing the phase and the frequency when switching between the transmission state and the reception state.

The phase acquisition unit 173 of the ranging device 100A acquires a first phase from the ranging device 100B when the ranging device 100B receives the first signal having the predetermined frequency transmitted by the first transmission process and the second transmission process performed by the ranging device 100A for each of the frequencies f1 through fm. Because the first signal is transmitted twice at each of the frequencies, the phase acquisition unit 173 acquires the first phase twice at each of the frequencies. The phase acquisition unit 173 acquires phase data indicating the first phase from the ranging device 100B by BLE packet communication using a frequency different from that of the communication for the distance measurement. The phase data indicating the first phase may be written in the payload of the BLE packet. In addition, the phase data indicating the first phase may be measured by the phase measurement unit 174 of the ranging device 100B and transmitted to the ranging device 100A.

The phase measurement unit 174 of the ranging device 100A measures the second phase when the ODM 140 receives the second signal during the first reception process and the second reception process performed for each of the frequencies f1 through fm. That is, the phase measurement unit 174 measures the second phase a plurality of times when the ODM 140 of the ranging device 100A receives the second signal for each of the plurality of frequencies (for example, three or more frequencies) from the ranging device 100B at different timings. Because the second signal is transmitted twice from the ranging device 100B for each of the frequencies f1 through fm, the phase measurement unit 174 acquires the second phase twice for each of the frequencies f1 through fm. The second phase is used for measuring the distance.

The signal strength acquisition unit 175 of the ranging device 100A acquires a second signal strength when the ODM 140 receives the second signal a plurality of times by repeatedly performing the first reception process and the second reception process for each of the frequencies f1 through fm. In addition, the signal strength acquisition unit 175 acquires, from the ranging device 100B, a first signal strength when the ranging device 100B receives the first signal a plurality of times. The first signal strength acquired from the ranging device 100B by the signal strength acquisition unit 175 is measured by the signal strength acquisition unit 175 of the ranging device 100B, written in the payload of the BLE packet as signal strength data, and the BLE packet is transmitted to the ranging device 100A as the second signal.

Accordingly, the signal strength acquisition unit 175 acquires the first signal strength from the signal strength data included in the second signal received a plurality of times by the ODM 140 which repeatedly performs the reception process.

A pair of the first signal and the second signal having the same frequency will be referred to as a signal pair. The first signal is transmitted a plurality of times by the first transmission process and these transmitted first signals have mutually different frequencies f1 through fm. In addition, the second signal is received a plurality of times by the first reception process, and these received second signals have mutually different frequencies f1 through fm. Similarly, the first signal is transmitted a plurality of times by the second transmission process, and these transmitted first signals have mutually different frequencies f1 through fm. Further, the second signal is received a plurality of times by the second reception process, and these received second signals have mutually different frequencies f1 through fm.

Hereinafter, a signal pair including the first signal transmitted by the first transmission process and the second signal received by the first reception process will be referred to as a first signal pair, and a signal pair including the first signal transmitted by the second transmission process and the second signal received by the second reception process will be referred to as a second signal pair. Further, the first signal pair and the second signal pair will simply be referred to as signal pairs when the two pairs are not particularly distinguished from each other.

The first signal pair is a signal pair of the first signal and the second signal (signals having the same frequency among a plurality of first signals and a plurality of second signals) transmitted and received by the first transmission process and the first reception process performed in the same time frame (first time frame) and having the same frequency (f1 through fm). The second signal pair is a signal pair of the first signal and the second signal (signals having the same frequency among the plurality of first signals and the plurality of second signals) transmitted and received by the second transmission process and the second reception process performed in the same time frame (second time frame) and having the same frequency (f1 through fm).

Because the number of first signals is equal to the number of second signals, the number of first signal pairs is equal to the number of first signals and the number of second signals in the first transmission process and the first reception process. Similarly, the number of the second signal pairs is equal to the number of the first signals and the number of the second signals in the second transmission process and the second reception process. In addition, the number of first signal pairs is equal to the number of second signal pairs.

The signal strength acquisition unit 175 acquires, as a signal strength of the plurality of first signal pairs and the plurality of second signal pairs, a first signal strength when the ranging device 100B receives the plurality of first signals or a second signal strength when the ODM 140 receives the plurality of second signals by repeatedly performing the reception process. The signal strength acquisition unit 175 acquires the first signal strength when the ranging device 100B receives the plurality of first signals by performing the first transmission process and the first reception process, or the second signal strength when the ODM 140 receives the plurality of second signals by repeatedly performing the reception process. The signal strength acquisition unit 175 acquires the first signal strength when the ranging device 100B receives the plurality of first signals by performing the second transmission process and the second reception process, or the second signal strength when the ODM 140 receives the plurality of second signals by repeatedly performing the reception process.

The signal strength acquisition unit 175 acquires the signal strength of a plurality of first signal pairs of the signals having the same frequency between the plurality of first signals and the plurality of second signals, and acquires the signal strength of a plurality of second signal pairs of the signals having the same frequency between the plurality of first signals and the plurality of second signals.

The reciprocating phase calculation unit 176 of the ranging device 100A calculates a first reciprocating phase by summing a first phase of the first signal and a second phase of the second signal included in each of the plurality of first signal pairs acquired by the signal strength acquisition unit 175. In addition, the reciprocating phase calculation unit 176 calculates a second reciprocating phase by summing the first phase of the first signal and the second phase of the second signal included in each of the plurality of second signal pairs acquired by the signal strength acquisition unit 175. The first reciprocating phase and the second reciprocating phase will simply be referred to as reciprocating phases when the two phases are not particularly distinguished from each other.

The extraction unit 177 of the ranging device 100A extracts, from the plurality of signal pairs, N signal pairs corresponding to N (N is an integer of 2 or more) signal strengths, excluding one or a plurality of signal strengths less than a predetermined threshold value among the signal strengths of the plurality of signal pairs obtained by the first transmission process, the second transmission process, the first reception process, and the second reception process for the frequencies f0 through fm. The N signal pairs are N signal pairs obtained by excluding one or a plurality of signal pairs having the signal strength less than the predetermined threshold value, from all of the signal pairs (the plurality of signal pairs) for which the signal strengths are acquired by the signal strength acquisition unit 175. The threshold value is a value that can exclude the signal pair for which the signal strength decreases due to multipath.

The extraction unit 177 extracts N first signal pairs from the plurality of first signal pairs, excluding one or a plurality of signal pairs in which the signal strength of the first signal or the second signal of the plurality of first signal pairs is less than the predetermined threshold value. In addition, the extraction unit 177 extracts N second signal pairs from the plurality of signal pairs, excluding one or a plurality of signal pairs in which the signal strength of the first signal or the second signal of the plurality of second signal pairs is less than the predetermined threshold value. In order to obtain two reciprocating phases from the first signal pair and the second signal pair, the extraction unit 177 excludes and does not extract the first signal pair and the second signal pair if the signal strength of at least one of the first signal transmitted by the first transmission process, the second signal received by the first reception process, the first signal transmitted by the second transmission process, and the second signal received by the second reception process is less than the predetermined threshold value.

The correction unit 178 of the ranging device 100A corrects a change in phase due to a relative movement with respect to the ranging device 100B for each of the N first reciprocating phases. The correction unit 178 corrects the change in phase due to the relative movement with respect to the ranging device 100B, using a difference between the first reciprocating phase and the second reciprocating phase with respect to the frequencies f1 through fm. In addition, the correction unit 178 obtains a relative speed with respect to the ranging device 100B, from the difference between the first reciprocating phase and the second reciprocating phase with respect to the frequencies f1 through fm, and corrects the N reciprocating phases, based on the relative speed between the ranging devices 100A and 100B and a time difference with which the plurality of first signal pairs and the plurality of second signal pairs are obtained, so that the N reciprocating phases and the N frequencies f1 through fm of the N first signal pairs corresponding to the N first reciprocating phases have a linear relationship. Specific correction contents of the correction unit 178 will be described later with reference to FIG. 11 through FIG. 13.

The distance measurement unit 179 of the ranging device 100A measures a distance to the ranging device 100B, based on the N first reciprocating phases corrected by the correction unit 178 and the plurality of frequencies f1 through fm.

The memory 170M of the ranging device 100A stores one or more programs, data, or the like required for the main controller 170A, the transmission-reception controller 171, the switching unit 172, the phase acquisition unit 173, the phase measurement unit 174, the signal strength acquisition unit 175, the reciprocating phase calculation unit 176, the extraction unit 177, the correction unit 178, and the distance measurement unit 179 of the control device 170 to perform the processes described above. The memory 170M stores the data or the like that sets predetermined frequencies and phases of the signals to be transmitted between the ranging devices 100A and 100B.

<Communication Method for Distance Measurements Performed by Ranging Devices 100A and 100B>

First, a communication method and a distance measurement method for a case where the effects of the multipath does not occur will be described.

Figure 3:
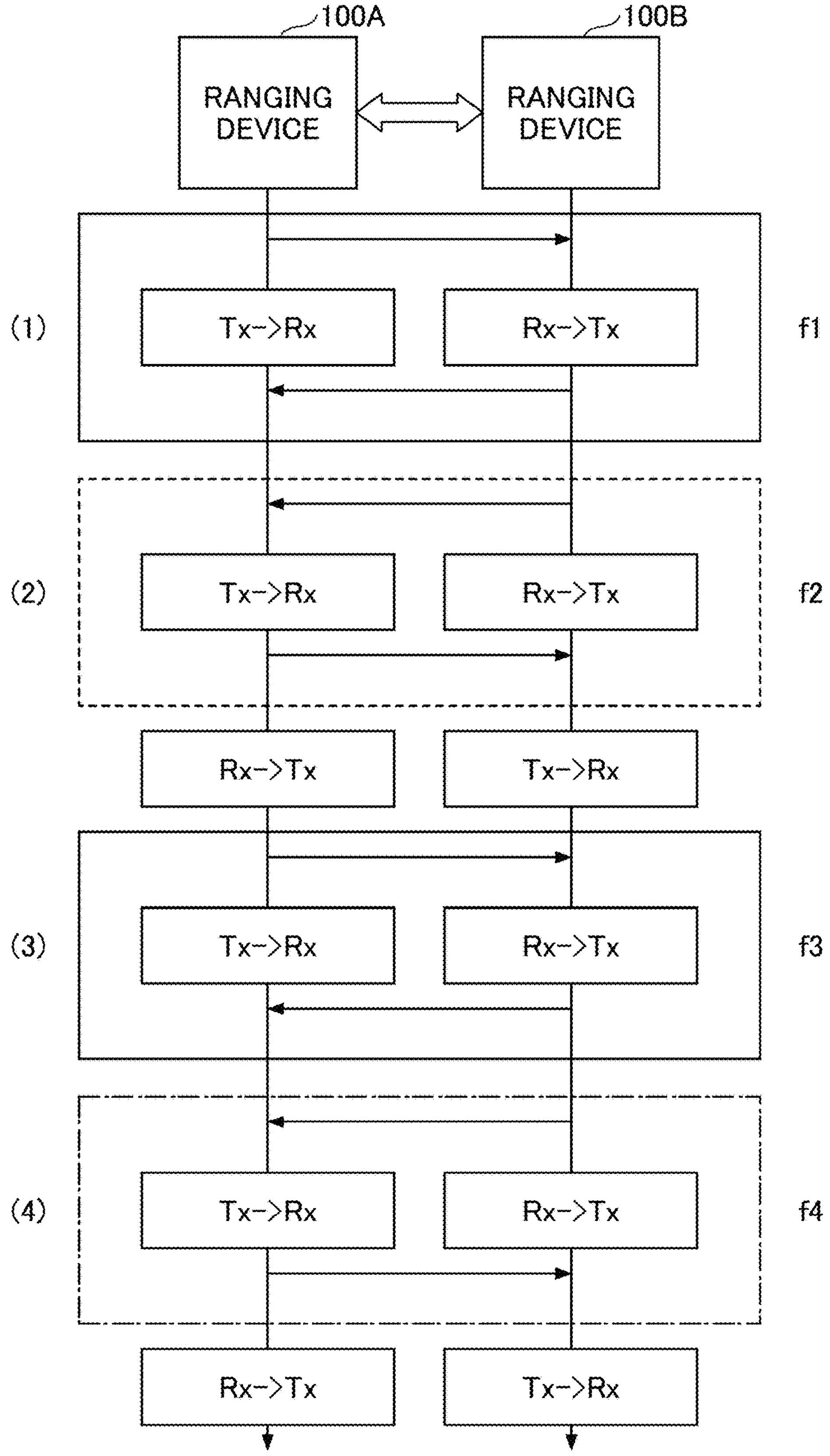
FIG. 3 is a diagram for explaining a communication method for distance measurements performed by the ranging devices 100A and 100B.

FIG. 3 is a diagram for explaining the communication method for distance measurements performed by the ranging devices 100A and 100B. As an example, it is assumed that the transmission-reception controller 171 of the ranging device 100A reads the data from the memory 170M and sets the frequency (predetermined frequency) and the phase of the first signal to be transmitted from the ranging device 100A to the ranging device 100B. In addition, it is assumed that the ranging device 100B transmits to the ranging device 100A the second signal having the same frequency and phase as the frequency and phase of the received first signal. It is assumed that the ranging devices 100A and 100B share the frequency and phase of the signals to be transmitted therebetween before performing the communication for the distance measurement.

During the communication for the distance measurement, the ranging devices 100A and 100B transmit signals having the same frequency to each other. More specifically, during the communication for the distance measurement, when one of the ranging devices 100A and 100B transmits a signal (first signal or second signal) having a certain frequency, the other of the ranging devices 100A and 100B transmits a signal (second signal or first signal) having the same certain frequency. Such transmissions from the one and the other of the ranging devices 100A and 100B corresponds to one communication of the communication for the distance measurement.

In FIG. 3, Tx indicates a transmitting side, and Rx indicates a receiving side. Rx→Tx and Tx→Rx, following a second communication (2) and a fourth communication (4), indicate switching of the transmitting and receiving sides. The switching may include a settling time for the phase and the frequency to settle.

In FIG. 3, as an example, during a first communication (1), the ranging device 100A transmits the first signal having the frequency f1 to the ranging device 100B, and the ranging device 100B transmits the second signal having the same frequency f1 to the ranging device 100A. The phase acquisition unit 173 of the ranging device 100A acquires, from the ranging device 100B, the phase when the ranging device 100B receives the first signal having the frequency f1 transmitted from the ranging device 100A. In addition, the phase measurement unit 174 of the ranging device 100A measures the phase when the ranging device 100A receives the second signal having the frequency f1 from the ranging device 100B.

During the second communication (2), the ranging device 100B transmits the second signal having the frequency f2 to the ranging device 100A, and the ranging device 100A transmits the first signal having the same frequency f2 to the ranging device 100B. The phase measurement unit 174 of the ranging device 100A measures the phase when the ranging device 100A receives the second signal having the frequency f2 from the ranging device 100B. In addition, the phase acquisition unit 173 of the ranging device 100A acquires, from the ranging device 100B, the phase when the ranging device 100B receives the first signal having the frequency f2 transmitted from the ranging device 100A.

During a third communication (3), the ranging device 100A transmits the first signal having the frequency f3 to the ranging device 100B, and the ranging device 100B transmits the second signal having the same frequency f3 to the ranging device 100A. The phase acquisition unit 173 of the ranging device 100A acquires, from the ranging device 100B, the phase when the ranging device 100B receives the first signal having the frequency f3 transmitted from the ranging device 100A. In addition, the phase measurement unit 174 of the ranging device 100A measures the phase when the ranging device 100A receives the second signal having the frequency f3 from the ranging device 100B.

During the fourth communication (4), the ranging device 100B transmits the second signal having the frequency f4 to the ranging device 100A, and the ranging device 100A transmits the first signal having the same frequency f4 to the ranging device 100B. The phase measurement unit 174 of the ranging device 100A measures the phase when the ranging device 100A receives the second signal having the frequency f4 from the ranging device 100B. In addition, the phase acquisition unit 173 of the ranging device 100A acquires, from the ranging device 100B, the phase when the ranging device 100B receives the first signal having the frequency f4 transmitted from the ranging device 100A.

The ranging devices 100A and 100B continue to perform the communication as illustrated in FIG. 3 while performing the distance measurement, the phase measurement unit 174 of the ranging device 100A measures the phase when the ranging device 100A receives the second signal from the ranging device 100B, and the phase acquisition unit 173 of the ranging device 100A acquires, from the ranging device 100B, the phase when the ranging device 100B receives the first signal transmitted from the ranging device 100A.

In this example, it is assumed that the first communication (1) through the fourth communication (4) are repeatedly performed in a short period, and the distance between the ranging devices 100A and 100B is the same. In this case, it is assumed that a phase when the ranging device 100B receives the first signal having the frequency fm transmitted from the ranging device 100A is denoted by $\phi AB$, and that the phase acquisition unit 173 of the ranging device 100A acquires the phase $\phi AB$. Further, it is assumed that a phase when the ranging device 100A receives the second signal having the frequency fm from the ranging device 100B is denoted by $\phi BA$, and that the phase measurement unit 174 of the ranging device 100A measures the phase BA. The frequency fm may be any one of the frequencies f1 through f4 described above, for example.

$\phi AB+\phi BA$ is a total phase (reciprocating phase) for a case where a two-way communication is performed between the ranging devices 100A and 100B with each of the frequencies f1 through f4. The reciprocating phase at the frequency fm is denoted by $\phi 2w$, where 2w is an abbreviation for two-way (bi-directional). The reciprocating phase during the first communication (frequency f1) is denoted by $\phi 1w1$, the reciprocating phase during the second communication (frequency f2) is denoted by $\phi 2w2$, the reciprocating phase during the third communication (frequency f3) is denoted by $\phi 2w3$, and the reciprocating phase during the fourth communication (frequency f4) is denoted by $\phi 2w4$. In addition, wavelengths at the frequencies f1 through f4 are denoted by $\lambda 1$ through $\lambda 4$, respectively. The reciprocating phase $\phi 2w$ described above is calculated by the reciprocating phase calculation unit 176.

As described above, when the first communication (1) through the fourth communication (4) are repeatedly performed in a short period, the distance between the ranging devices 100A and 100B during the two-way communication may be regarded as being the same, and for this reason, when the distances between the ranging devices 100A and 100B during the first communication (1) through the fourth communication (4) is denoted by L, the following formulas (1) through (4) stand. 2 L indicates a round-trip distance. n is an integer greater than or equal to one.

$$2L=(n+\phi 2w1)\times\lambda 1 \quad (1)$$

$$2L=(n+\phi 2w2)\times\lambda 2 \quad (2)$$

$$2L=(n+\phi 2w3)\times\lambda 3 \quad (3)$$

$$2L=(n+\phi 2w4)\times\lambda 4 \quad (4)$$

When n is eliminated from the formulas (1) and (2), the following formula (5A) is obtained, and when the formula (5A) is transformed into the following formulas (5B) through (5D), the distance L can be obtained. c denotes the speed of light.

$$2L/\lambda 1-\phi 2w1=2L/\lambda 2-\phi 2w2 \quad (5A)$$

$$2L(1/\lambda 2-1/\lambda 1)=\phi 2w2-\phi 2w1 \quad (5B)$$

$$2L(f2-f1)/C=\phi 2w2-\phi 2w1 \quad (5C)$$

$$L/c=(1/2)\times(\phi 2w2-\phi 2w1)/(f2-f1) \quad (5D)$$

Similarly, when n is eliminated from the formulas (1) and (3), these formulas can be transformed into the following formula (6).

$$L/c=(1/2)\times(\phi 2w3-\phi 2w1)/(f3-f1) \quad (6)$$

Similarly, when n is eliminated from the formulas (1) and (4), these formulas can be transformed into the following formula (7).

$$L/c=(1/2)\times(\phi 2w4-\phi 2w1)/(f4-f1) \quad (7)$$

The formulas (5D), (6), and (7) indicate that a ratio of a phase difference between the two reciprocating phases ϕ2wm (where m is 1 to 4) to a frequency difference between the two frequencies fm corresponds to a ratio of the distance L to the speed c of light.

For this reason, when the phase difference between the two reciprocating phases ϕ2wm is denoted by Δϕ, and the frequency difference between the two frequencies fm is denoted by Δf, the formulas (5D), (6), and (7) can be expressed by the following formula (8).

$$L/c=(1/2)\times\Delta\phi/\Delta f \quad (8)$$

Figure 4:
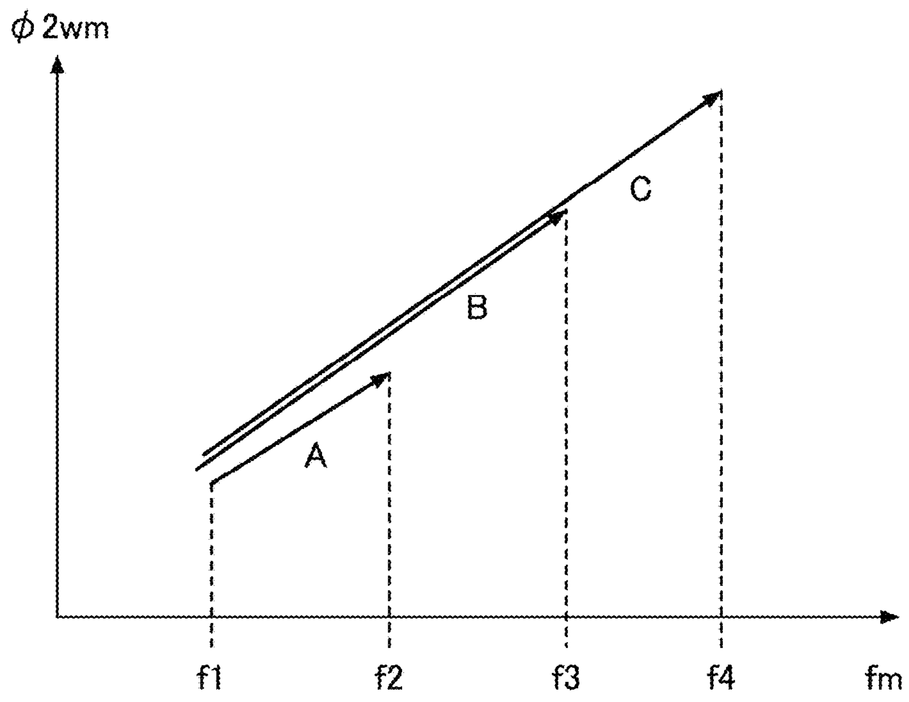
FIG. 4 is a diagram illustrating a relationship between a frequency fm and a phase ϕ2wm in the distance measurement.

FIG. 4 is a diagram illustrating a relationship between frequency fm and the phase ϕ2wm during the distance measurement. When the ratios of the distance L to the speed c of light obtained by the formulas (5D), (6), and (7) are represented by slopes A, B, and C, respectively, the slopes A, B, and C can be indicated as illustrated in FIG. 4. More specifically, the slope A can be represented by A=(½)×Δϕ/Δf=(ϕ2w2−ϕ2w1)/(f2−f1). The slope B can be represented by B=(½)×Δϕ/Δf=(ϕ2w3−ϕ2w1)/(f3−f1). The slope C can be represented by C=(½)×Δϕ/Δf=(ϕ2w4−ϕ2w1)/(f4−f1). Of course, only one of the slope A which is obtained from the two frequencies f1 and f2, the slope B which is obtained from the two frequencies f1 and f3, and the slope C which is obtained from the two frequencies f1 and f4, may be obtained. Further, although the slopes A, B, and C are obtained from two frequencies (f1 and f2, f1 and f3, and f1 and f4) in this example, a straight line may be obtained by linear approximation using the least squares method for three or more points given by the frequencies fm and the phases ϕ2wm, using three or more frequencies, and the slope of the obtained straight line may be obtained from L/c.

The distance L can be obtained from the combination of the frequencies f1 and f2 by multiplying the speed c of light to the slope A. The distance L can be obtained from the combination of the frequencies f1 and f3 by multiplying the speed c of light to the slope B. The distance L can be obtained from the combination of the frequencies f1 and f4 by multiplying the speed c of light to the slope C. The distance L is obtained by the distance measurement unit 179.

<Multipath>

When the multipath occurs, the phase of the radio wave arriving after being reflected on the way is different from the phase of the radio wave directly arriving from the device of the transmission source. In such a case, it may not be possible to accurately measure the distance, because a propagation path of the radio wave arriving after being reflected on the way differs from a propagation path of the radio wave directly arriving from the device of the transmission source.

Figure 5:
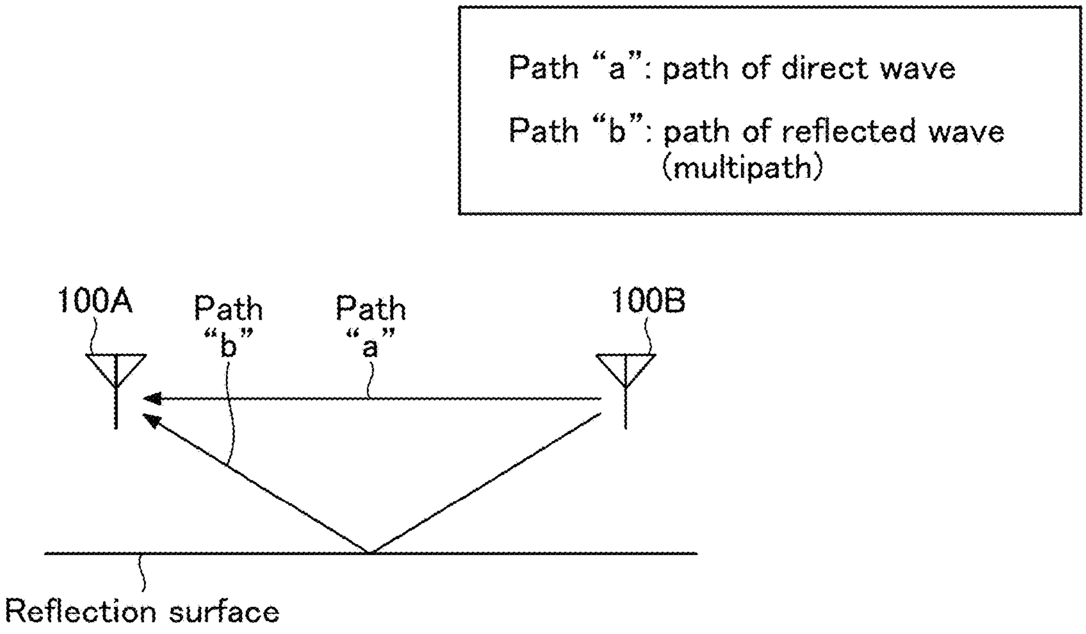
FIG. 5 is a diagram for explaining a path "a" of a direct wave and a path "b" of a multipath.

FIG. 5 is a diagram for explaining a path "a" of a direct wave and a path "b" of a multipath. The path "a" of the direct wave is a path in which the radio wave directly propagates from the ranging device 100B to the ranging device 100A. The path "b" of the multipath is a path in which radio wave propagates after being reflected by a reflecting surface, such as the ground, a wall of a building, or the like when the radio wave propagates from the ranging device 100B to the ranging device 100A. The path "b" of the multipath is long compared to the path "a" of the direct wave.

Figure 6:
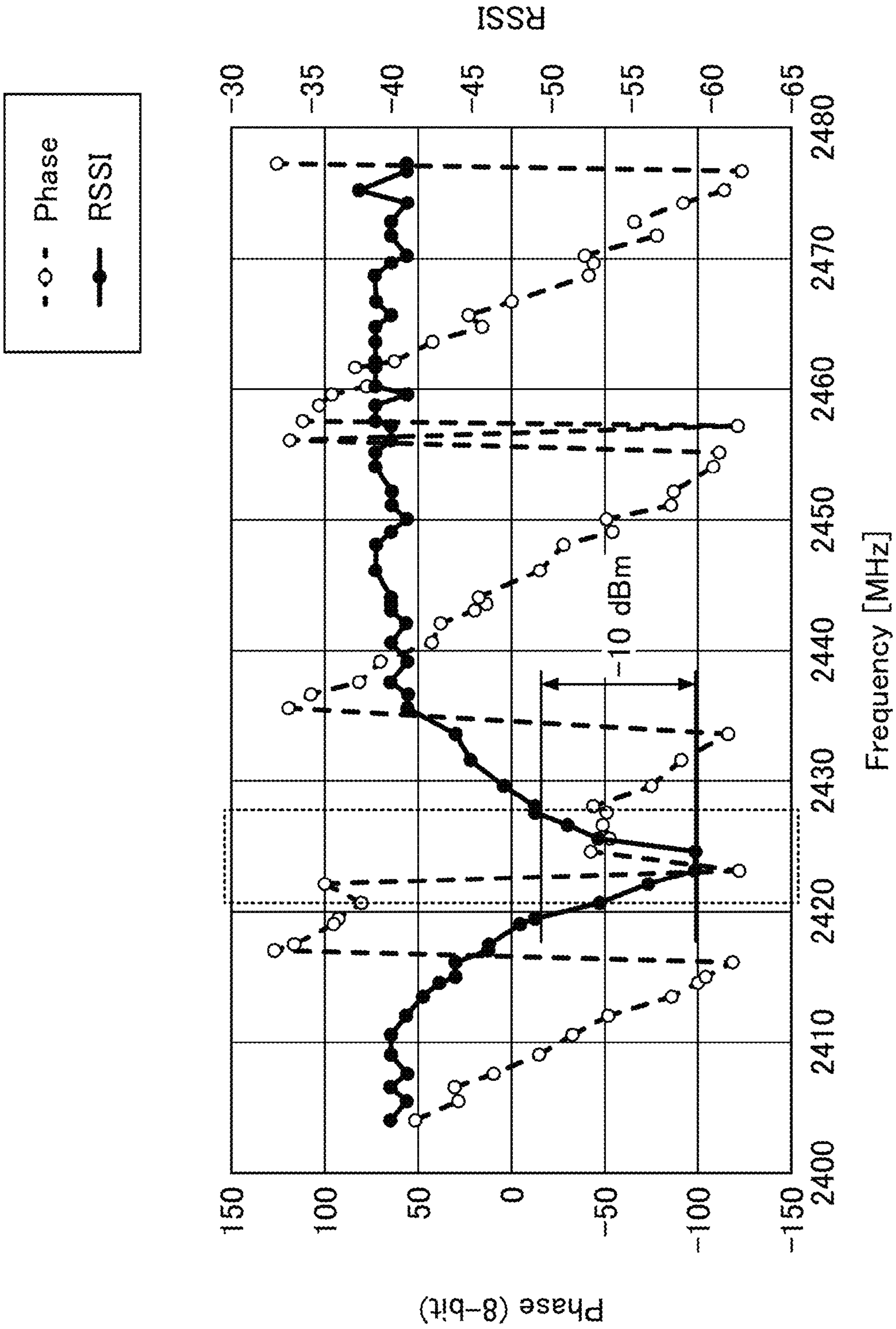
FIG. 6 is a diagram illustrating an example of a relationship between a frequency and a reciprocating phase of a first signal and a second signal in a case where a multipath occurs.

FIG. 6 is a diagram illustrating an example of a relationship between the frequency and the reciprocating phase of the first signal and the second signal in a case where the multipath occurs. In FIG. 6, the abscissa indicates the frequency (MHz) of the first signal and the second signal transmitted between the ranging devices 100A and 100B. The left ordinate indicates the reciprocating phase, and the right ordinate indicates the signal strength (RSSI). In FIG. 6, the phase characteristic is indicated by a broken line, and the signal strength (RSSI) characteristic is indicated by a solid line.

In a case where the multipath does not occur, the reciprocating phase decreases approximately linearly with increasing frequency, such as in a frequency band of approximately 2436 MHz to approximately 2456 MHz, and in a frequency band of approximately 2456 MHz to approximately 2476 MHz. In addition, because the multipath does not occur in the frequency band of approximately 2436 MHz to approximately 2456 MHz, and in the frequency band of approximately 2456 MHz to approximately 2476 MHz, a favorable value of −40 or greater can be obtained for the signal strength (RSSI).

In contrast, in the case where the multipath occurs, there is a frequency band (frequency band in a vicinity of approximately 2416 MHz) in which the reciprocating phase changes (in this case, decreases) sharply with increasing frequency, such as a frequency band of approximately 2436 MHz to approximately 2424 MHz, and the signal strength (RSSI) decreases sharply in such a frequency band. In the frequency band in which the reciprocating phase decreases sharply, the signal strength (RSSI) decreases due to multi-fading. When the reciprocating phase changes nonlinearly in such a manner, the reciprocating phase having an appropriate value cannot be obtained in such a frequency band, and distance measurement cannot be performed appropriately. The nonlinear change in the reciprocating phase can be detected from the signal strength (RSSI).

For this reason, the ranging device 100A detects a frequency band in which the signal strength (RSSI) becomes low, and excludes the reciprocating phases in such a frequency band from the data for the distance measurement. This is to make certain that the distance measurement is performed accurately even in an environment where the multipath occurs.

<Doppler Effect>

Figure 7:
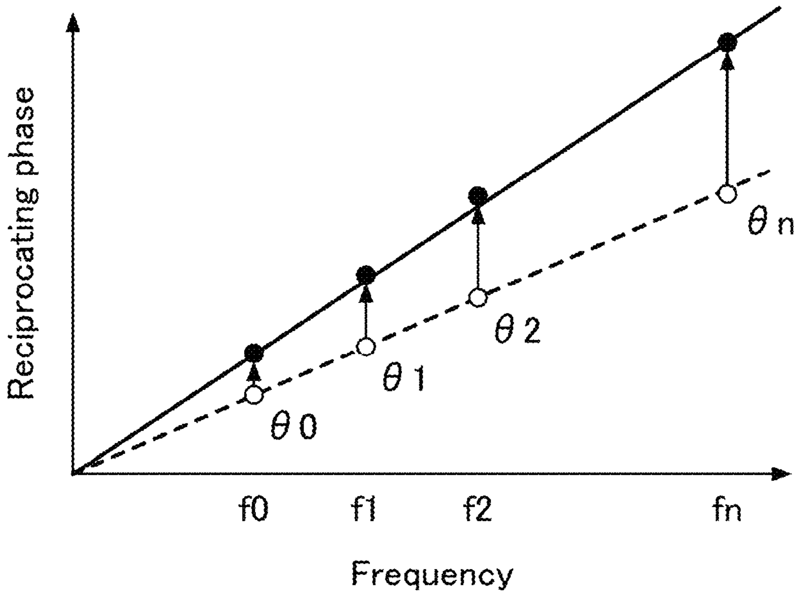
FIG. 7 is a diagram for explaining a relationship of the reciprocating phase with respect to the frequency in a case where a radio wave transmitted and received between the ranging devices 100A and 100B are affected by the Doppler effect.

FIG. 7 is a diagram for explaining a relationship of the reciprocating phase with respect to the frequency in a case where the radio waves transmitted and received between the ranging devices 100A and 100B are affected by the Doppler effect. For example, when a user holding the smart key 20 including the ranging device 100B moves while operating the automatic parking assistance system installed in the vehicle 10, the distance between the ranging devices 100A and 100B changes.

It is assumed that the relationship between the frequencies f0 through fm and the reciprocating phases θ0 through θm, indicated by a broken line in FIG. 7, is obtained in a case where the distance between the vehicle 10 and the smart key 20 is constant. As an example, the frequencies f0 through fm are equally spaced, and increase in an order from f0 to fm in increments of 1 MHz.

In this case, when the user holding the smart key 20 moves away from the vehicle 10 at a constant moving speed v (m/s) in a state where the vehicle 10 is stationary, the relationship between the frequencies f0 through fm and the reciprocating phases θ0 through θm shifts as indicated by a solid line due to the Doppler effect. When the time t is used, θm shifts as expressed by the following formula (9) due to the Doppler effect. As expressed by the formula (9), the higher the frequency fm, the larger the shift of the reciprocating phase θm due to the Doppler effect.

$$\theta n + \frac{2\pi fn \times n}{c} vt \tag{9}$$

If the moving speed v (m/s) of the user is known, the characteristics indicated by the solid line in FIG. 7 can be corrected to the characteristics indicated by the broken line, and thus, the ranging device 100A can detect the moving speed v (m/s) of the user in the following manner. Both the user holding the smart key 20 and the vehicle 10 may move, and in such a case, a relative moving speed may be detected.

Figure 8:
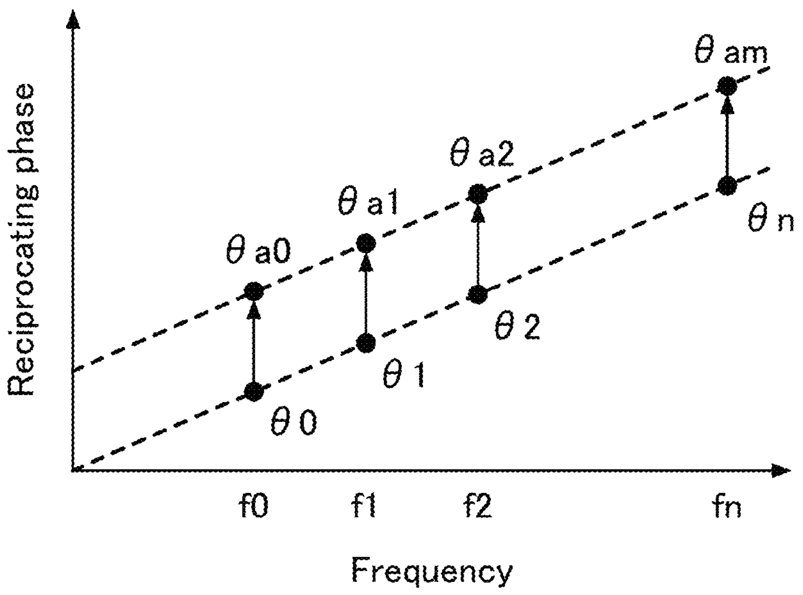
FIG. 8 is a diagram for explaining a method for detecting a moving speed v (m/s)

FIG. 8 is a diagram for explaining a method for detecting the moving speed v (m/s). The first reciprocating phases θ0 to θm for the frequencies f0 through fm are obtained by performing the first transmission process and the first reception process for each of the frequencies f0 through fm, and the second reciprocating phases θa0 to θam for the frequencies f0 through fm are obtained by performing the second transmission process and the second reception process for each of the frequencies f0 through fm.

When the user is moving, if the first transmission process and the first reception process are performed for each of the frequencies f0 through fm in a first time frame, and the second transmission process and the second reception process are performed thereafter for each of the frequencies f0 through fm in a second time frame after the first time frame, the differences Δθ0 through Δθm between the first reciprocating phases θ0 through Gm and the second reciprocating phases θa0 through Gam for each of the frequencies f0 through fm become constant values, as illustrated in FIG. 8. When a first reciprocating phase θk (k=0 to m) in this case is used, a second reciprocating phase θak can be expressed by the following formula (10). The frequency of the first reciprocating phase θk and the second reciprocating phase Oak is assumed to be fk.

$$\theta ak = \theta k + \frac{2\pi fk}{c} vt \tag{10}$$

When the difference Δθk (k=0 to m) is obtained based on the formula (10), the moving speed v can be obtained using a time difference between the first time frame and the second time frame as the time t. Such a calculation of the moving speed v is performed by the correction unit 178.

Specifically, when the reciprocating phase at an end time tA of the first time frame is denoted by θA, the reciprocating phase at an end time tB of the second time frame is denoted by θB, and the time t (=tB−tA), a difference Δθ (=θB−θA) of the reciprocating phases, and the moving speed v are used, for example, the following formula (11) stands with respect to the Doppler effect.

$$\Delta\theta / t = (-4\pi/\lambda) \times v \tag{11}$$

The reciprocating phase calculation unit 176 calculates the reciprocating phase 8A at the end time tA of the first time frame, and calculates the reciprocating phase GB at the end time tB of the second time frame, and the correction unit 178 can obtain the moving speed v by substituting the difference Δθ (=θB−θA) of the reciprocating phases at the time t (=tB−tA) into the formula (11).

<Timings of Transmission Process and Reception Process>

As described above, the transmission-reception controller 171 performs the first transmission process once in one continuous wave transmission period (2.5 milliseconds) in BLE (registered trademark), performs the first reception process once in another continuous wave transmission period, performs the second transmission process once in still another continuous wave transmission period, and performs the second reception process once in still another continuous wave transmission period.

Accordingly, the ranging device 100A performs the transmission process or the reception process once in each continuous wave transmission period, thereby transmitting the first signal having three or more kinds of frequencies f1 through fm to the ranging device 100B at different timings, and receiving the second signal having the three or more kinds of frequencies f1 through fm from the ranging device 100B at different timings.

Because the continuous wave transmission period is 2.5 milliseconds and extremely short, the transmission process or the reception process is performed once, and the transmission process or the reception process is repeatedly performed in a plurality of continuous wave transmission periods, so as to perform the distance measurement.

Because the BLE (registered trademark) packet communication is also used for other purposes (for example, transmission of an audio signal) other than the distance measurement, the time usable for the distance measurement is extremely limited. For this reason, there are demands to achieve a highly accurate distance measurement in a short a time as possible, and thus, the ranging device 100A performs the transmission process or the reception process once in each continuous wave transmission period. In addition, by adding up results obtained by performing the transmission process or reception process once in a plurality of intermittent continuous wave transmission periods, the relationship between the reciprocating phase with respect to the frequencies f1 through fm can be obtained to perform the distance measurement.

<Method for Extracting Signal Pair>

Figure 9A:
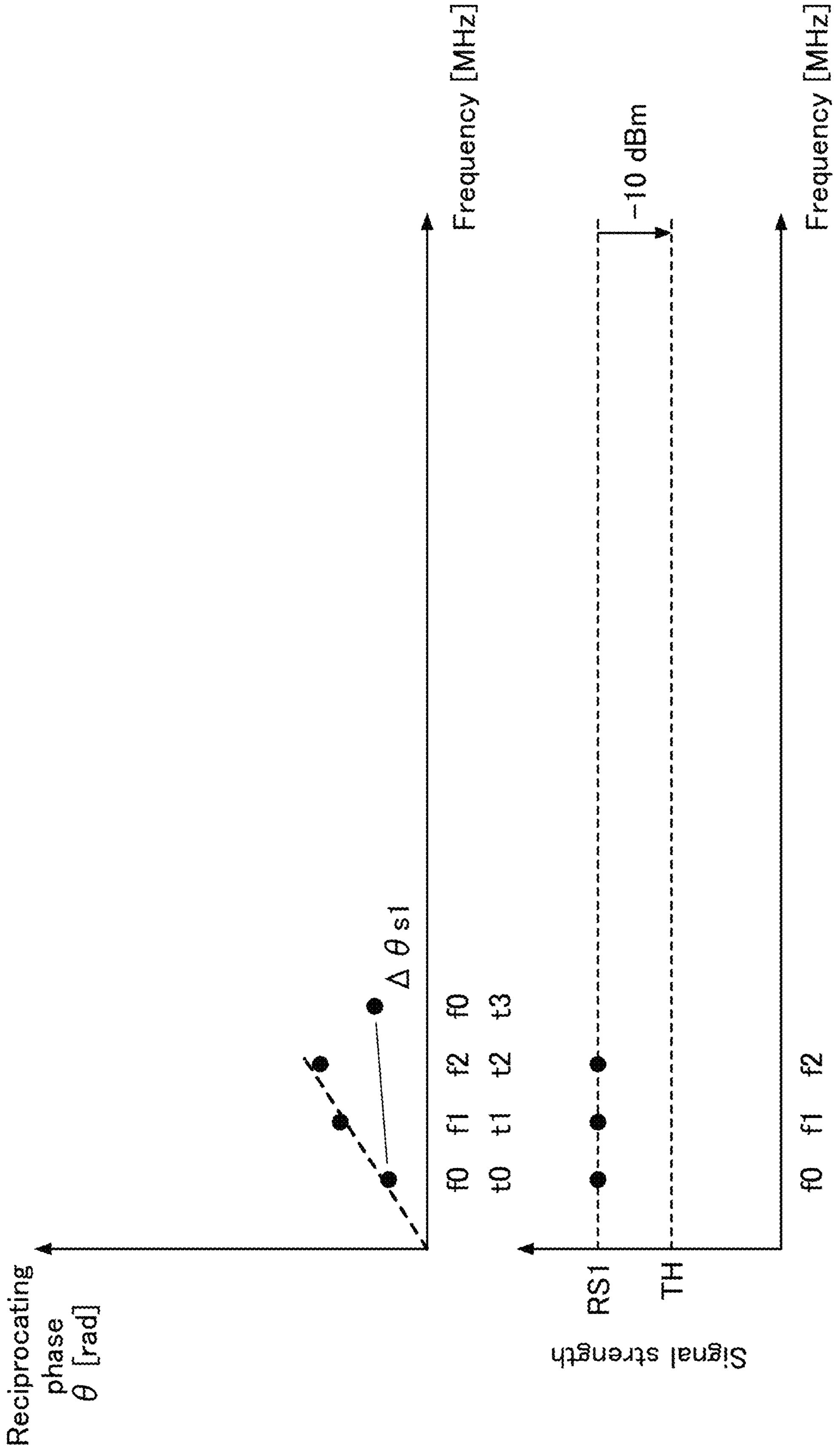
FIG. 9A is a diagram illustrating the reciprocating phase (on the upper side) with respect to frequencies f0 through fm, and a signal strength (on the lower side) with respect to the frequencies f0 through fm, obtained by performing a first transmission process and a first reception process in a plurality of continuous wave transmission periods.
Figure 9B:
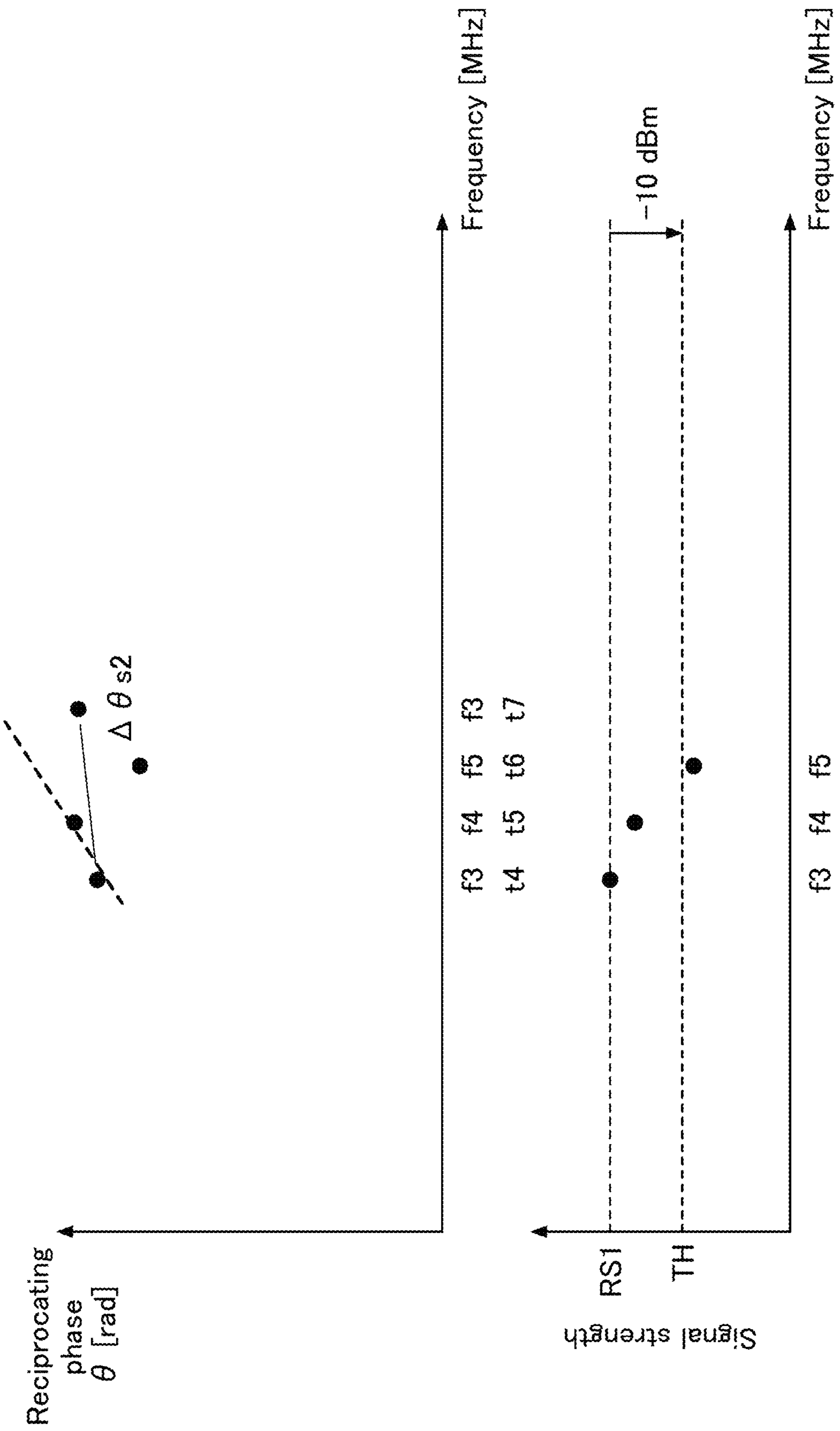
FIG. 9B is a diagram illustrating the reciprocating phase (on the upper side) with respect to frequencies f0 through fm, and the signal strength (on the lower side) with respect to the frequencies f0 through fm, obtained by performing the first transmission process and the first reception process in the plurality of continuous wave transmission periods.
Figure 9C:
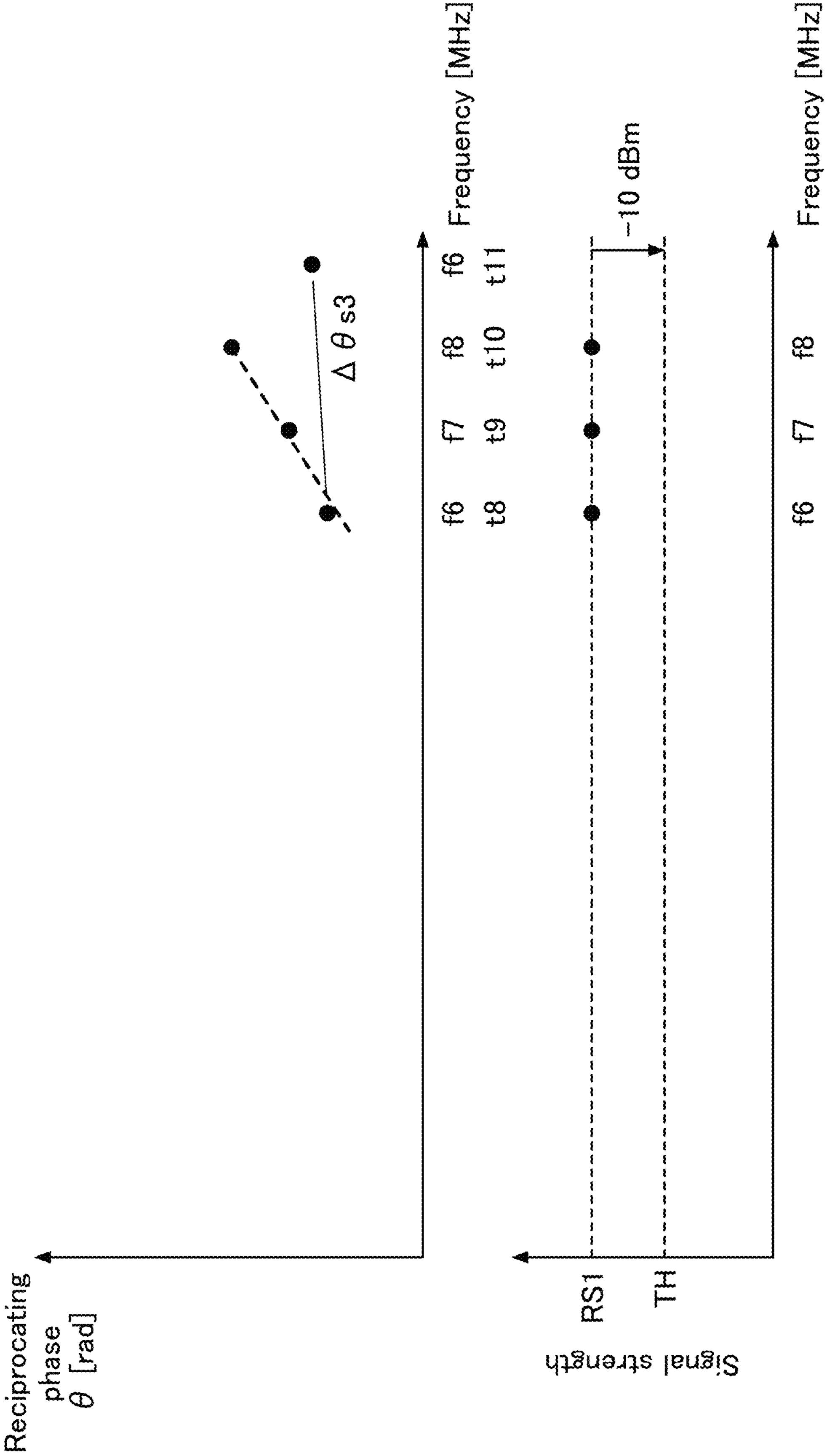
FIG. 9C is a diagram illustrating the reciprocating phase (on the upper side) with respect to frequencies f0 through fm, and the signal strength (on the lower side) with respect to the frequencies f0 through fm, obtained by performing the first transmission process and the first reception process in the plurality of continuous wave transmission periods.

FIG. 9A, FIG. 9B, and FIG. 9C are diagrams illustrating the reciprocating phase (on the upper side) with respect to the frequencies, and the signal strength (on the lower side) with respect to the frequencies, obtained by performing the first transmission process and the first reception process in a plurality of continuous wave transmission periods. The signal strength illustrated in FIG. 9A, FIG. 9B, and FIG. 9C is a lower value between the RSSI of the first signal and the RSSI of the second signal. An example of a method for extracting the signal pair will be described with reference to FIG. 9A, FIG. 9B, and FIG. 9C. A threshold value TH of the signal strength of the signal pair to be extracted by the extraction unit 177 has a level that is dBm lower than a signal strength RS1 for the case where no multipath occurs, for example. In the following description, the plurality of frequencies are assumed to be f0 through fm.

Although the reciprocating phase (on the upper side) with respect to the frequencies, and the signal strength (on the lower side) with respect to the frequencies, obtained by performing the first transmission process and the first reception process for each of the continuous wave transmission periods are illustrated, the same holds true for the reciprocating phase with respect to the frequencies, and the signal strength with respect to the frequencies, obtained by performing the second transmission process and the second reception process for each of the continuous wave transmission periods. Times t0 through t2 illustrated in FIG. 9A are equally spaced, times t3 through t5 illustrated in FIG. 9B are equally spaced, and times t6 through t8 illustrated in FIG. 9C are equally spaced. The spacing of the times t0 through t2, t3 through t5, and t6 through t8 are all the same.

FIG. 9A illustrates the reciprocating phases (on the upper side) for the frequencies, and the signal strengths (on the lower side) with respect to the frequencies f0, f1, and f2, obtained by performing one first transmission process and one first reception process for the frequencies f0, f1, and f2. The signal strength acquisition unit 175 and the reciprocating phase calculation unit 176 acquire the signal strength and the reciprocating phase with respect to the frequency f0 at the time t0, acquire the signal strength and the reciprocating phase with respect to the frequency f1 at the time t1, acquire the signal strength and the reciprocating phase with respect to the frequency f2 at the time t2, and acquire the signal strength and the reciprocating phase with respect to the frequency f0 at the time t3, respectively. The signal strength acquisition unit 175 and the reciprocating phase calculation unit 176 acquire the signal strength and the reciprocating phase twice with respect to the frequency f0 at the times t0 and t3, respectively.

FIG. 9B illustrates the reciprocating phases (on the upper side) for the frequencies, and the signal strengths (on the lower side) with respect to the frequencies f3, f4, and f5, obtained by performing one first transmission process and one first reception process for the frequencies f3, f4, and f5. The signal strength acquisition unit 175 and the reciprocating phase calculation unit 176 acquire the signal strength and the reciprocating phase with respect to the frequency f3 at the time t4, acquire the signal strength and the reciprocating phase with respect to the frequency f4 at the time t5, acquire the signal strength and the reciprocating phase with respect to the frequency f5 at the time t6, and acquire the signal strength and the reciprocating phase with respect to the frequency f3 at the time t7, respectively. The signal strength acquisition unit 175 and the reciprocating phase calculation unit 176 acquire the signal strength and the reciprocating phase with respect to the frequency f3 twice, at the times t4 and t7.

FIG. 9C illustrates the reciprocating phases (on the upper side) for the frequencies, and the signal strengths (on the lower side) with respect to the frequencies f6, f7, and f8, obtained by performing one first transmission process and one first reception process for the frequencies f6, f7, and f8. The signal strength acquisition unit 175 and the reciprocating phase calculation unit 176 acquire the signal strength and the reciprocating phase with respect to the frequency f6 at the time t8, acquire the signal strength and the reciprocating phase with respect to the frequency f7 at the time t9, acquire the signal strength and the reciprocating phase with respect to the frequency f8 at the time t10, and acquire the signal strength and the reciprocating phase with respect to the frequency f6 at the time t11, respectively. The signal strength acquisition unit 175 and the reciprocating phase calculation unit 176 acquire the signal strength and the reciprocating phase with respect to the frequency f6 twice, at the times t8 and t11.

In addition, the correction unit 178 obtains the difference Δθ of the reciprocating phase acquired twice with respect to the same frequency. The difference Δθ refers to a difference Δθ between the first reciprocating phase and the second reciprocating phase. The correction unit 178 obtains a difference Δθs1 for the frequency f0 illustrated in FIG. 9A, a difference Δθs2 for the frequency f3 illustrated in FIG. 9B, and a difference Δθs3 for the frequency f6 illustrated in FIG. 9C. In FIG. 9A, a straight line fitted to the reciprocating phases with respect to the frequencies f0, f1, and f2 are indicated by a broken line. In FIG. 9B, a straight line fitted to the reciprocating phases with respect to the frequencies f3, f4, and f5 is indicated by a broken line. In FIG. 9C, a straight line fitted to the reciprocating phases with respect to the frequencies f6, f7, and f8 is indicated by a broken line.

Further, when the signal strength is observed in FIG. 9A through FIG. 9C, the signal strength is greater than or equal to the threshold value TH for the frequencies f0 through f2, f3, f4, and f6 through f8, but the signal strength is less than the threshold value TH for the frequency f5.

Figure 10:
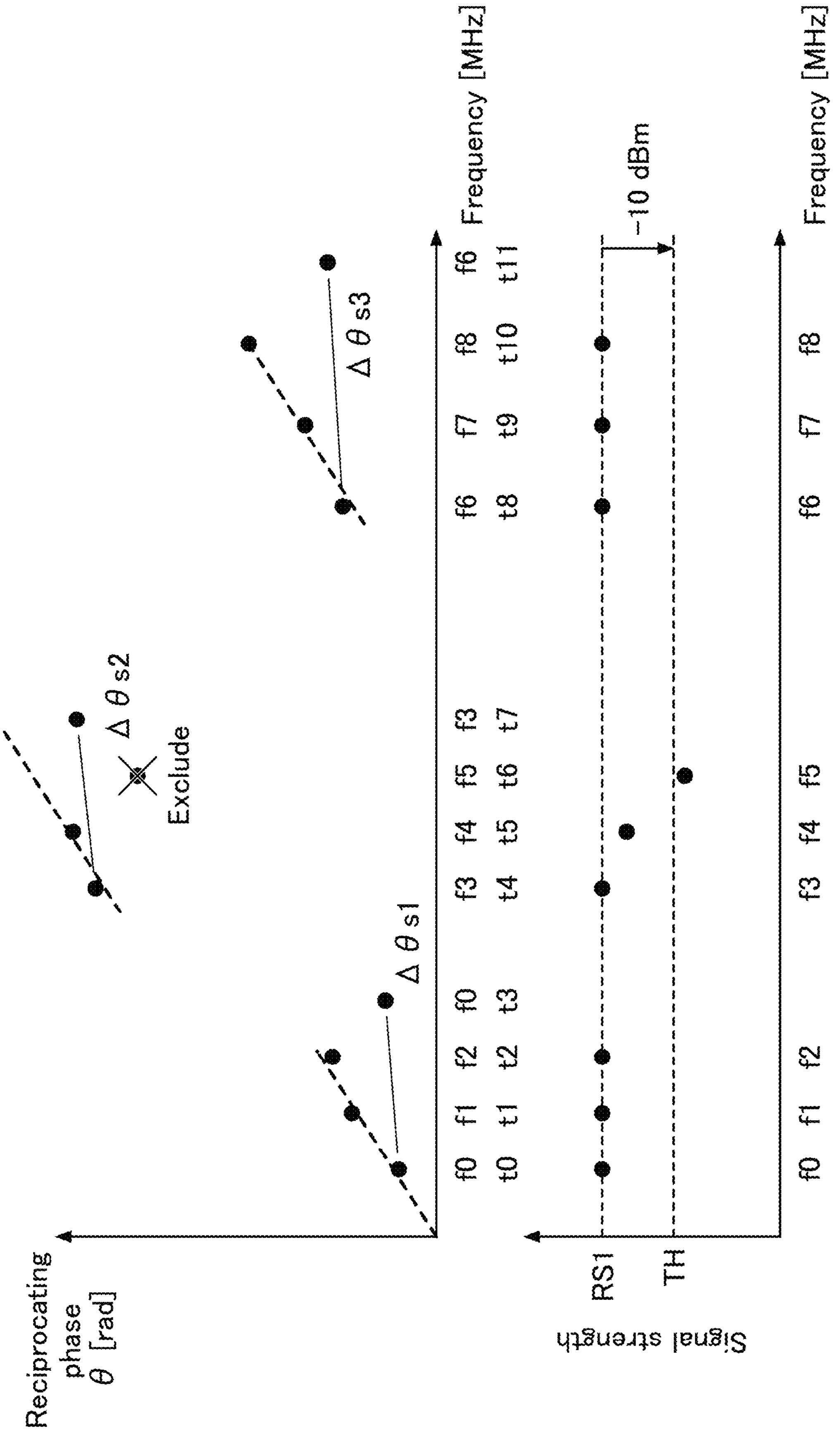
FIG. 10 is a diagram illustrating signal pairs extracted by an extraction unit 177, by gathering results of FIG. 9A through FIG. 9C.

In such a case, the extraction unit 177 excludes the signal pair having the signal strength less than the threshold value TH, and extracts the reciprocating phases calculated for the signal pairs having the signal strength greater than or equal to the threshold value TH. FIG. 10 is a diagram illustrating the signal pairs extracted by the extraction unit 177, by gathering the results of FIG. 9A through FIG. 9C. As illustrated in FIG. 10, the extraction unit 177 excludes the signal pair for the frequency f5 having the signal strength less than the threshold value TH, and extracts the reciprocating phases calculated for the signal pairs for the frequencies f0 through f2, f3, f4, and f6 through f8.

Figure 11:
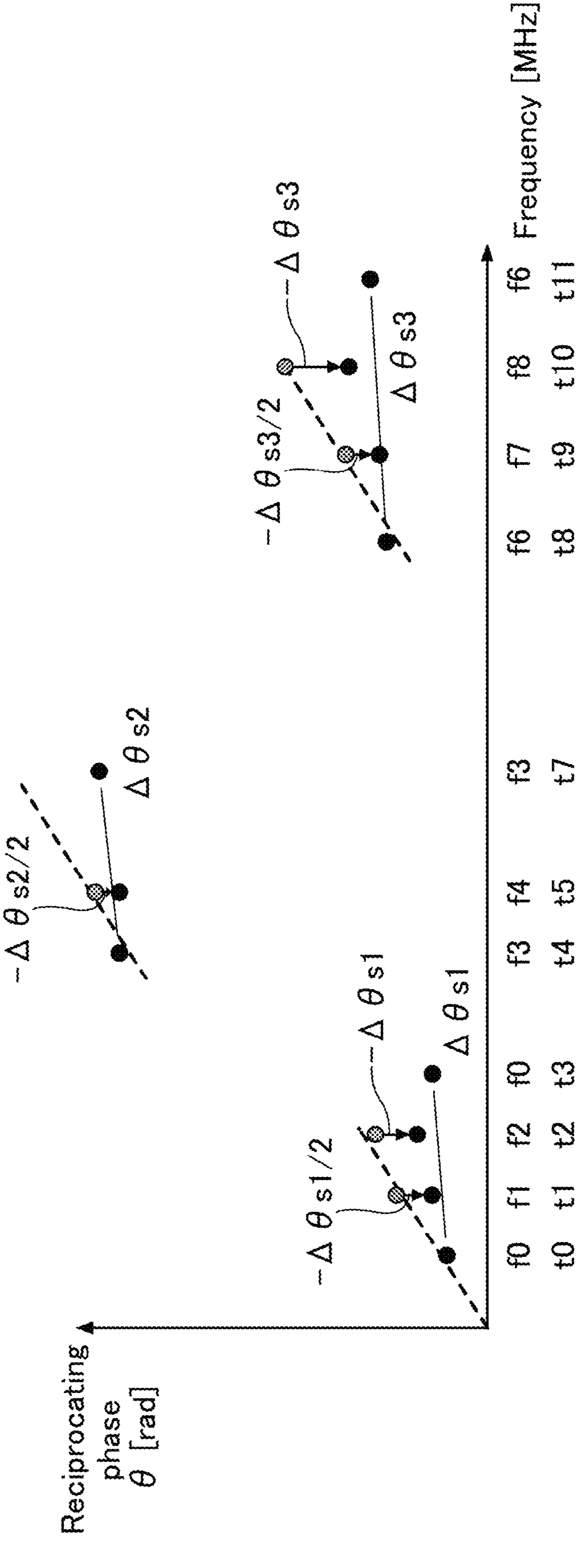
FIG. 11 is a diagram for explaining a speed correction process of a correction process performed by a correction unit 178.

FIG. 11 is a diagram for explaining a speed correction process of the correction process performed by the correction unit 178. The speed correction process is a process of correcting the effects of the Doppler effect due to the relative movement of the ranging devices 100A and 100B.

The correction unit 178 corrects the reciprocating phases with respect to the frequencies f0 and f1, by equally allocating the difference Δθs1 for the frequency f0 to the reciprocating phases with respect to the frequencies f1 and f2, for the reciprocating phases obtained with respect to the frequencies f0, f1, and f2. Because the difference Δθs1 of the reciprocating phase acquired twice with respect to the frequency f0 corresponds to an increase in the reciprocating phase for the frequency f0 at the time t3 with respect to the reciprocating phase for the frequency f0 at the time t0, the correction unit 178 subtracts (Δθs1)/2 from the reciprocating phase with respect to the frequency f1 and subtracts Δθs1 from the reciprocating phase with respect to the frequency f2. Because the times t0 through t3 are equally spaced, a value obtained by multiplying a ratio corresponding to an elapsed time from the time t0 to the difference Δθs1 is used as a correction value. That is, the correction value for the reciprocating phase with respect to the frequency f1 is −(Δθs1)/2, and the correction value for the reciprocating phase with respect to the frequency f2 is −Δθs1.

Similarly, because a difference Δθs2 of the reciprocating phase acquired twice with respect to the frequency f3 corresponds to an increase in the reciprocating phase for the frequency f3 at the time t4 with respect to the reciprocating phase for the frequency f3 at the time t7, the correction unit 178 subtracts (Δθs2)/2 from the reciprocating phase with respect to the frequency f4. Because the times t4 through t7 are equally spaced, a value obtained by multiplying a ratio corresponding to an elapsed time from the time t4 to the difference Δθs2 is used as the correction value. That is, the correction value for the reciprocating phase with respect to the frequency f4 is −(Δθs2)/2.

Because a difference Δθs3 of the reciprocating phase acquired twice with respect to the frequency f6 corresponds to an increase in the reciprocating phase for the frequency f6 at the time t8 with respect to the reciprocating phase for the frequency f6 at the time t11, the correction unit 178 subtracts (Δθs3)/2 from the reciprocating phase with respect to the frequency f7. Because the times t8 through t11 are equally spaced, a value obtained by multiplying a ratio corresponding to an elapsed time from the time t8 to the difference Δθs3 is used as the correction value. That is, the correction value for the reciprocating phase with respect to the frequency f7 is −(Δθs3)/2, and the correction value for the reciprocating phase with respect to the frequency f8 is −Δθs3.

Figure 12:
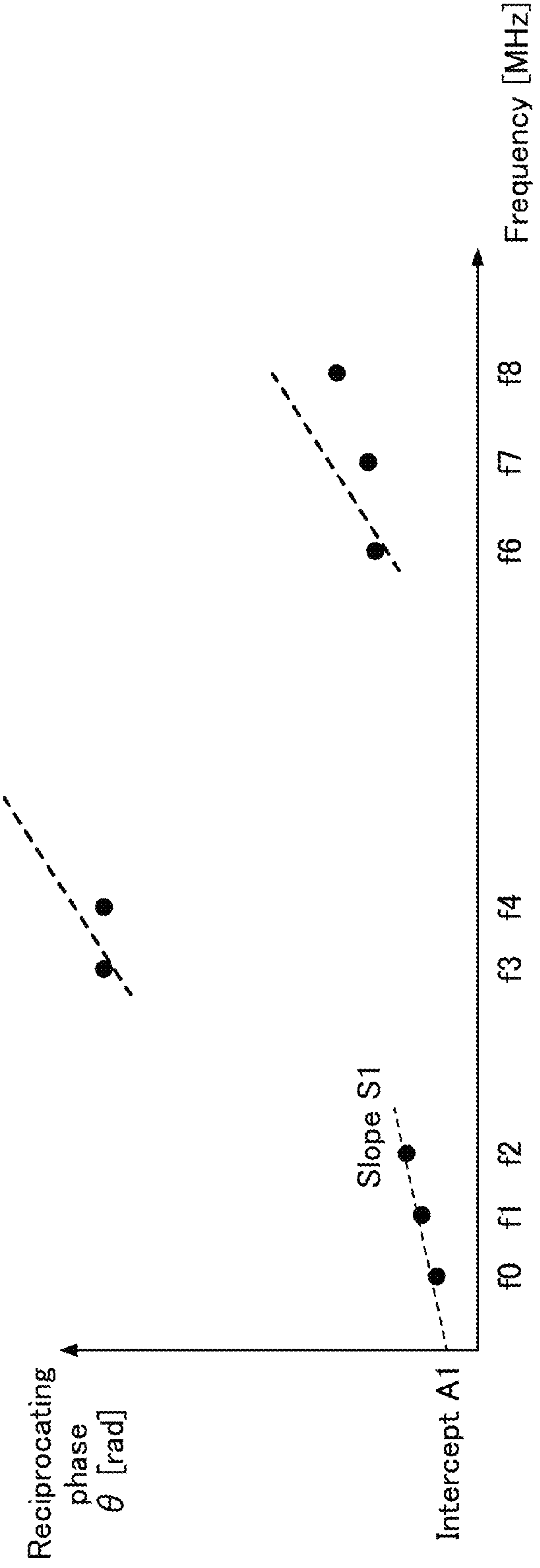
FIG. 12 is a diagram for explaining a linear correction process of the correction process performed by the correction unit 178.
Figure 13:
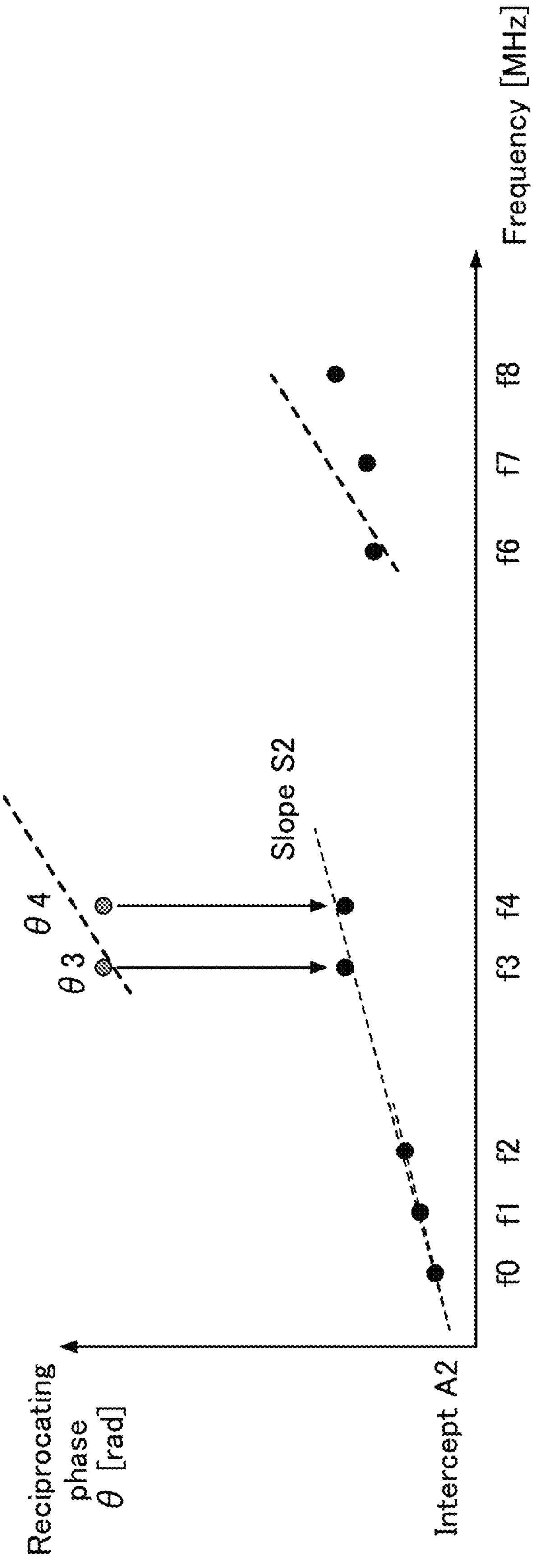
FIG. 13 is a diagram for explaining the linear correction process of the correction process performed by the correction unit 178.
Figure 14:
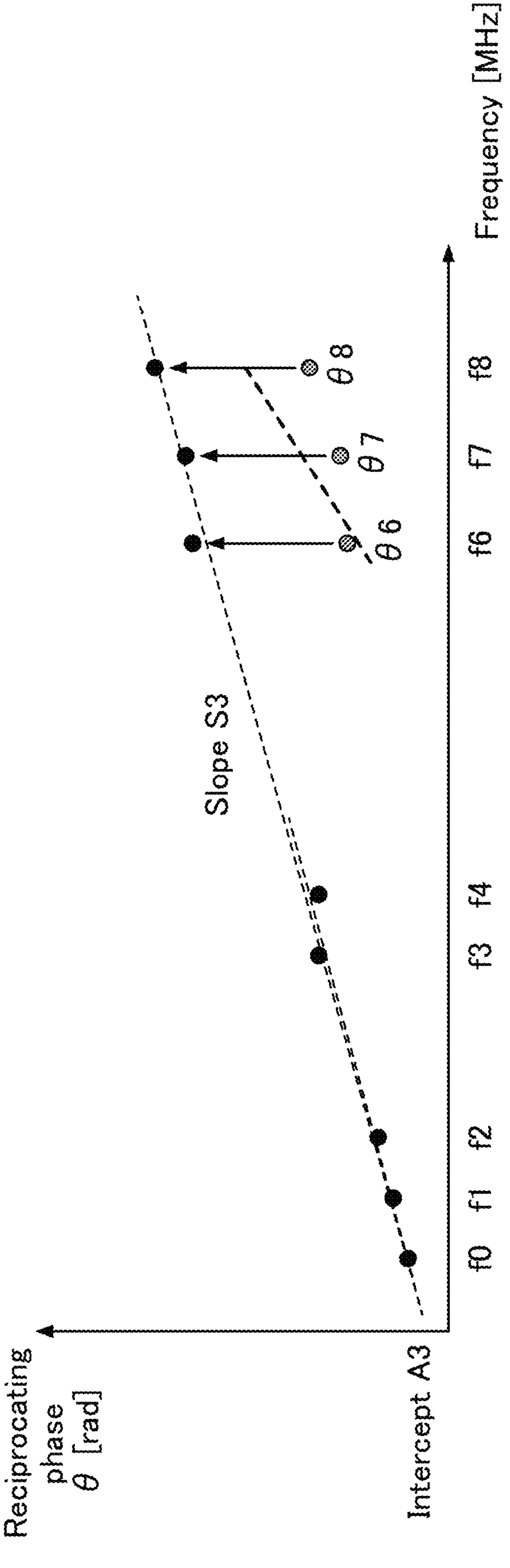
FIG. 14 is a diagram for explaining the linear correction process of the correction process performed by the correction unit 178.

FIG. 12, FIG. 13, and FIG. 14 are diagrams for explaining a linear correction process of the correction process performed by the correction unit 178. The correction unit 178 calculates a slope S1 and an intercept A1 of a straight line that fits the reciprocating phase with respect to the frequencies f0, f1, and f2, as illustrated in FIG. 12.

Next, the correction unit 178 offsets the reciprocating phase with respect to the frequencies f3 and f4 so that the reciprocating phase with respect to the frequencies f3 and f4 touches a straight line that fits the reciprocating phase with respect to the frequencies f0, f1, and f2, as illustrated in FIG. 13, using the calculated slope S and intercept A. The reciprocating phase θ3 with respect to the frequency f3 is offset by subtracting (θ3−(f3×S1+A1)) from θ3, as illustrated in FIG. 13. The reciprocating phase θ4 with respect to the frequency f4 is offset by subtracting (θ3−(f3×S1+A1)) from θ4, as illustrated in FIG. 13. The reciprocating phases θ3 and θ4 with respect to the frequencies f3 and f4 are offset by using the same correction value (θ3−(f3×S1+A1)). Then, the correction unit 178 calculates a slope S2 and an intercept A2 of a straight line that fits the reciprocating phase with respect to the frequencies f0, f1, f2, f3, and f4.

Next, the correction unit 178 offsets the reciprocating phase with respect to the frequencies f0, f1, f2, f3, and f4 so that the reciprocating phase with respect to the frequencies f6, f7, and f8 touches a straight line that fits the reciprocating phase with respect to the frequencies f0, f1, f2, f3, and f4, as illustrated in FIG. 14, using the slope S2 and the intercept A2 of the straight line that fits the reciprocating phase with respect to the frequencies f0, f1, f2, f3, and f4. The reciprocating phase θ6 with respect to the frequency f6 is offset by subtracting (θ6−(f6×S2+A2)) from θ6, as illustrated in FIG. 14. The reciprocating phases θ7 and θ8 with respect to the frequencies f7 and f8 are offset by subtracting (θ6−(f6×S2+A2)) from θ7 and θ8, respectively, as illustrated in FIG. 14. The reciprocating phases θ6, θ7, and θ8 with respect to the frequencies f6, f7, and f8 are offset by using the same correction value (θ6−(f6×S2+A2)). Then, the correction unit 178 calculates a slope S3 and an intercept A3 of a straight line that fits the reciprocating phase with respect to the frequencies f0, f1, f2, f3, f4, f6, f7, and f8.

By performing the process described above on the reciprocating phase with respect to the frequencies f0 through fm, N reciprocating phases are corrected with respect to the frequencies f0 through fm, so that the N reciprocating phases, and N frequencies of N signal pairs corresponding to the N reciprocating phases, have a linear relationship. This process corresponds to the linear correction process. Then, the distance measurement unit 179 measures the distance of the ranging device 100B with respect to the ranging device 100A, using the linear relationship between the N reciprocating phases and the N frequencies of the N signal pairs corresponding to the N reciprocating phases (for example, the straight line having the intercept A3 and the slope S3 illustrated in FIG. 14) obtained in the manner described above.

<Flow Chart>

Figure 15:
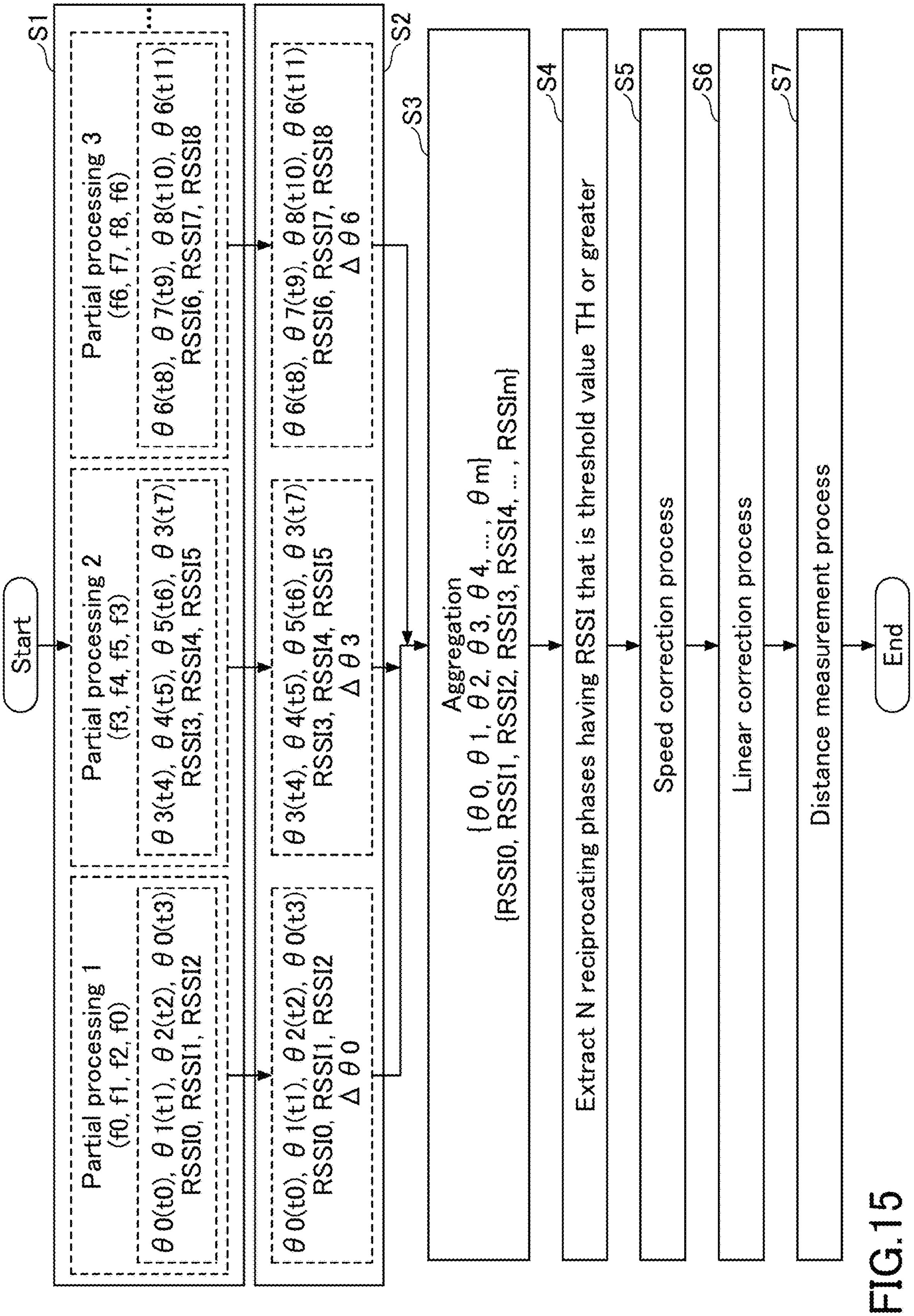
FIG. 15 is a flow chart illustrating an example of a process performed by a control device 170.

FIG. 15 is a flow chart illustrating an example of a process performed by the control device 170.

When the process starts, the signal strength acquisition unit 175 and the reciprocating phase calculation unit 176 perform the first transmission process, the first reception process, the second transmission process, and the second reception process, using three kinds of frequencies for each continuous wave transmission period (step S1). The signal strength acquisition unit 175 and the reciprocating phase calculation unit 176 perform the first transmission process, the first reception process, the second transmission process, and the second reception process in different continuous wave transmission periods.

In step S1 of FIG. 15, a partial processing 1, a partial processing 2, and a partial processing 3 are illustrated as an example. As described with reference to FIG. 9A, the partial processing 1 is a process of acquiring reciprocating phases θ0(t0), θ1(t1), θ2(t2), and θ0(t3) and signal strengths RSSI1, RSSI2, and RSSI3, by performing one first transmission process and one first reception process for the frequencies f0, f1, and f2. The times t0 through t3 are times at which the first signal related to the reciprocating phase is transmitted.

As described with reference to FIG. 9B, the partial processing 2 is a process of acquiring reciprocating phases θ3(t4), θ4(t5), θ5(t6), and θ3(t7) and signal strengths RSSI3, RSSI4, and RSSI5, by performing one first transmission process and one first reception process for the frequencies f3, f4, and f5. The times t4 through t7 are times at which the first signal related to the reciprocating phase is transmitted. As described with reference to FIG. 9C, the partial processing 3 is a process of acquiring reciprocating phases θ6(t8), θ7(t9), θ8(t10), and θ6(t11), and signal strengths RSSI6, RSSI7, and RSSI8, by performing one first transmission process and one first reception process for the frequencies f6, f7, and f8. The times t8 through t11 are times at which the first signal related to the reciprocating phase is transmitted. The signal strength acquisition unit 175 and the reciprocating phase calculation unit 176 repeatedly perform similar processes up to the frequency fm.

The signal strength acquisition unit 175 and the reciprocating phase calculation unit 176 output the reciprocating phases and the signal strengths obtained in the first transmission process, the first reception process, the second transmission process, and the second reception process performed in step S1 (step S2). In step S2, the correction unit 178 obtains the difference Δθ of the reciprocating phase acquired twice with respect to the same frequency during each process.

The main controller 170A gathers all of the data obtained in step S2 (step S3).

The extraction unit 177 extracts the reciprocating phases calculated for the signal pairs having the signal strength greater than or equal to the threshold value TH (step S4). In step S4, N frequencies of N signal pairs corresponding to N reciprocating phases are extracted.

The correction unit 178 performs a speed correction process (step S5). In order to correct the effects of the Doppler effect due to the relative movement of the ranging devices 100A and 100B, the correction unit 178 performs the speed correction process described with reference to FIG. 11 on the reciprocating phase with respect to the three kinds of frequencies obtained by a plurality of partial processings including the partial processing 1, the partial processing 2, and the partial processing 3.

The correction unit 178 performs a linear correction process (step S6). As described with reference to FIG. 12 through FIG. 14, the linear correction process is a process of correcting the N reciprocating phases, so that the N reciprocating phases, and N frequencies of N signal pairs corresponding to the N reciprocating phases, have a linear relationship. The linear relationship between the frequency and the reciprocating phase is obtained as illustrated in FIG. 14 as an example.

The distance measurement unit 179 measures the distance to the ranging device 100B, based on the intercept and the slope of the linear relationship between N first reciprocating phases corrected by the correction unit 178 in step S6 and the plurality of frequencies (step S7).

In the above description, the reciprocating phase with respect to the lowest frequency is acquired twice during the plurality of partial processings including the partial processing 1, the partial processing 2, and the partial processing 3, and the correction unit 178 obtains the difference Δθ of the reciprocating phase acquired twice with respect to the same frequency during each partial processing in step S2. By obtaining the difference Δθ of the reciprocating phase obtained twice with respect to the same frequency during each partial processing, the effects of the Doppler effect can be corrected more accurately according to a variation in the relative moving speed of the ranging devices 100A and 100B. In addition, during each partial processing, the reciprocating phase may be acquired twice with respect to frequencies other than the lowest frequency.

However, in at least one partial processing among the plurality of partial processings, the reciprocating phase may be acquired twice with respect to the lowest frequency, and the effects of the Doppler effect may be corrected in step S5, using the moving speed calculated based on the difference Δθ of the reciprocating phase acquired twice. For example, during the partial processing 1, the effects of the Doppler effect may be corrected for the partial processings other than the partial processing 1, using the moving speed calculated based on the difference Δθ of the reciprocating phase acquired twice with respect to the lowest frequency f0. In a case where the relative moving speed of the ranging devices 100A and 100B may be regarded as being constant, such an arrangement can simplify the processing.

As described above, the reciprocating phases are obtained and the signal strengths are acquired with respect to the plurality of signal pairs, N signal pairs corresponding to N signal strengths (N is an integer greater than or equal to two) excluding one or a plurality of signal strengths less than the predetermined threshold value among the signal strengths of the plurality of signal pairs are extracted from the plurality of signal pairs, and the distance to the ranging device 100B is measured based on the N reciprocating phases and the plurality of frequencies. For this reason, the effects of multipath can be prevented.

Accordingly, it is possible to provide the ranging device 100 capable of accurately measuring the distance even in an environment in which a multipath occurs.

In addition, because N signal pairs, excluding one or a plurality of signal pairs in which the signal strength of the first signal or the second signal is less than the predetermined threshold value, are extracted from the plurality of signal pairs, it is possible to more positively prevent the effects of the multipath, and to more accurately perform the distance measurement.

Moreover, the transmission-reception controller 171 causes the OM 130 to repeatedly perform a transmission process to transmit the first signal with respect to the ranging device 100B in a predetermined period, so that the OM 130 transmits the first signal having three or more kinds of frequencies with respect to the ranging device 100B at different timings, and causes the ODM 140 to repeatedly perform a reception process to receive the second signal from the ranging device 100B in the predetermined period, so that the ODM 140 receives the second signal having three or more kinds of frequencies from the ranging device 100B at different timings. For this reason, even in a state where the period in which the transmission process and the reception process are performed is limited, it is possible to positively acquire a relationship between the frequency and the reciprocating phase, and to accurately perform the distance measurement.

Because the first phase acquisition unit 173 acquires a plurality of first phases from the plurality of second signals that are received when the ODM 140 repeatedly performs the reception process, it is possible to easily and positively acquire the first phase when the first signal measured by the phase measurement unit 174 of the ranging device 100B is received. As a result, it is possible to accurately perform the distance measurement.

Moreover, the signal strength acquisition unit 175 acquires, as the signal strength of the plurality of signal pairs, the first signal strength when the ranging device 100B receives the plurality of first signals, or the second signal strength when the ODM 140 receives the plurality of second signals by repeatedly performing the reception process. For this reason, it is possible to calculate the reciprocating phase using the phase at the time of signal reception, and to more accurately perform the distance measurement.

Further, the signal strength acquisition unit 175 acquires the first signal strength from the signal strength data included in the plurality of second signals received when the ODM 140 repeatedly performs the reception process. The first signal strength when the ranging device 100B receives the first signal can be acquired from the second signal, and the reciprocating phase can be calculated based on the first signal strength acquired from the second signal, and thus, it is possible to more accurately perform the distance measurement. The ranging device 100B may include the signal strength acquisition unit 175, and the signal strength acquisition unit 175 of the ranging device 100B may acquire the second signal strength by writing the second signal strength in the first signal transmitted from the ranging device 100A.

The correction unit 178 is provided to correct a change in the reciprocating phase due to the relative movement with respect to the ranging device 100B for each of the N reciprocating phases, and the distance measurement unit 179 measures the distance to the ranging device 100B, based on the N reciprocating phases corrected by the correction unit 178 and the plurality of frequencies. Hence, it is possible to correct the effects of the Doppler effect due to the relative movement with the ranging device 100B, and to more accurately perform the distance measurement.

The transmission-reception controller 171 causes the OM 130 to transmit the first signal a plurality of times for each of the plurality of frequencies, and causes the ODM 140 to receive the second signal a plurality of times for each of the plurality of frequencies. The reciprocating phase calculation unit 176 obtains a plurality of reciprocating phases for each of the plurality of frequencies, with respect to each of the N signal pairs. The correction unit 178 corrects a change in the reciprocating phase due to the relative movement with respect to the ranging device 100B, using a difference between the plurality of reciprocating phases obtained for each of the plurality of frequencies by the reciprocating phase calculation unit 176, with respect to each of the N signal pairs. Based on the difference between the plurality of reciprocating phases, it is possible to correct the effects of the Doppler effect according to the change in the relative moving speed with respect to the ranging device 100B, and to more accurately perform the distance measurement.

The correction unit 178 obtains the relative speed with respect to the ranging device 100B from the difference between the plurality of reciprocating phases obtained for each of the N signal pairs, and corrects the N reciprocating phases so that the N reciprocating phases and N frequencies of the N signal pairs corresponding to the N reciprocating phases have a linear relationship, based on the relative speed and a time difference with which each signal pair is obtained. For this reason, the N reciprocating phases and the N frequencies obtained in an intermittent period, such as a continuous wave transmission period of the BLE (registered trademark), can be arranged on a straight line, and it is possible to accurately perform the distance measurement even in a situation where the acquisition of the N reciprocating phases and the N frequencies is divided into a plurality of intermittent periods.

The predetermined period is a continuous wave transmission period. For this reason, it is possible to accurately perform the distance measurement, based on the N reciprocating phases and the N frequencies obtained in the plurality of intermittent continuous wave transmission periods of the BLE (registered trademark).

The continuous wave transmission period is 2.5 milliseconds. For this reason, it is possible to accurately perform the distance measurement, based on the N reciprocating phases and the N frequencies obtained in the plurality of extremely short intermittent periods of 2.5 milliseconds of the BLE (registered trademark).

The predetermined threshold value is a threshold value that can exclude one or a plurality of signal pairs having the signal strength reduced by the multipath. For this reason, it is possible to eliminate the effects of the multipath, and to accurately perform the distance measurement.

According to the embodiments described above, it is possible to provide a ranging device capable of accurately measuring a distance even in an environment where a multipath occurs.

Although the embodiments of the ranging device according to the present invention is described heretofore, the present invention is not limited to the specifically disclosed embodiments, and various variations and modifications can be made without departing from the scope of the present invention.

What is claimed is:

1. A ranging device comprising:

a memory device configured to store a program; and a processor configured to execute the program stored in the memory and perform a process including:

transmitting a first signal to an other device;

receiving a second signal from the other device that receives the first signal;

acquiring a plurality of first phases when the other device receives a plurality of first signals having three or more kinds of frequencies transmitted by the transmitting to the other device at different timings;

measuring a plurality of second phases when the receiving receives a plurality of second signals having the three ore more kinds of frequencies transmitted from the other device at different timings;

acquiring a signal strength of a pair of the first signal and the second signal having identical frequencies, with respect to a plurality of signal pairs of the plurality of first signals and the plurality of second signals;

calculating a reciprocating phase by summing the first phase and the second phase of the first signal and the second signal included in each first signal pair of the plurality of first signal pairs, for each signal pair of the plurality of signal pairs;

extracting, from the plurality of signal pairs, N signal pairs corresponding to N (N is an integer of 2 or more) signal strengths, excluding one or a plurality of signal strengths less than a predetermined threshold value among signal strengths of the plurality of signal pairs;

measuring a distance to the other device, based on the N reciprocating phases and the plurality of frequencies;

controlling a transmission and a reception, including:

causing the transmitting to repeatedly perform a transmission process to transmit the first signal with respect to the other device during a predetermined period, to transmit the first signals having the three or more kinds of frequencies to the other device at the different timings, and causing the receiving to repeatedly perform a reception process to receive the second signal from the other device during the predetermined period, to receive the second signals having the three or more kinds of frequencies from the other device at the different timings; and correcting a change in the reciprocating phase due to a relative movement with respect to the other device, for each reciprocating phase of the N reciprocating phases, wherein the measuring the distance measures the distance to the other device, based on the N reciprocating phases corrected by the correcting, and the plurality of frequencies.

2. The ranging device as claimed in claim 1, wherein the extracting extracts N signal pairs from the plurality of signal pairs, excluding one or a plurality of signal pairs in which the signal strength of the first signal or the second signal is less than the predetermined threshold value among the plurality of signal pairs.

3. The ranging device as claimed in claim 1, wherein the acquiring the plurality of first phases acquires the plurality of first phases from phase data included in the plurality of the second signals that are received when the receiving repeatedly performs the reception process.

4. The ranging device as claimed in claim 1, wherein the acquiring the signal strength acquires, as the signal strength of the plurality of signal pairs, a first signal strength when the other device receives the plurality of the first signals, or a second signal strength when the receiving receives the plurality of the second signals by repeatedly performing the reception process.

5. The ranging device as claimed in claim 4, wherein the acquiring the signal strength acquires the first signal strength from signal strength data included in the plurality of the second signals that are received when the receiving repeatedly performs the reception process, or acquires the second signal strength from signal strength data included in the plurality of the first signals that are received when the receiving repeatedly performs the reception process.

6. The ranging device as claimed in claim 1, wherein:

the controlling the transmission and the reception includes causing the transmitting to transmit the first signal a plurality of times for each frequency of the plurality of frequencies, and causing the receiving to receive the second signal a plurality of times for each frequency of the plurality of frequencies, the calculating obtains a plurality of reciprocating phases for each frequency of the plurality of frequencies, with respect to each signal pair of the N signal pairs, and the correcting corrects the change in the reciprocating phase due to the relative movement with respect to the other device, using a difference of the plurality of reciprocating phases obtained for each frequency of the plurality of frequencies by the calculating, with respect to each signal pair of the N signal pairs.

7. The ranging device as claimed in claim 6, wherein the correcting includes obtaining a relative speed with respect to the other device from the difference of the plurality of reciprocating phases obtained for each signal pair of the N signal pairs, and correcting the N reciprocating phases, based on the relative speed and a time difference with which each signal pair of the plurality of signal pairs are obtained, so that the N reciprocating phases and the N frequencies of the N signal pairs corresponding to the N reciprocating phases have a linear relationship.

8. The ranging device as claimed in claim 1, wherein the predetermined period is a continuous wave transmission period.

9. The ranging device as claimed in claim 8, wherein the continuous wave transmission period is 2.5 milliseconds.

10. The ranging device as claimed in claim 1, wherein the predetermined threshold value is a threshold value capable of excluding one or a plurality of the signal pairs whose signal strength is reduced due to multipath.

* * * * *